US009878356B2

(12) United States Patent
De Leij et al.

(10) Patent No.: US 9,878,356 B2
(45) Date of Patent: Jan. 30, 2018

(54) COMPOSITE ADSORBENT MATERIAL

(71) Applicants: The University of Surrey, Surrey (GB); The Forestry Commission, Edinburgh (GB)

(72) Inventors: Franciscus Antonius Anna Maria De Leij, West Sussex (GB); James Stratford, Guildford (GB); Helen Sneath, Isle of Anglesey (GB); Tony Hutchings, Surrey (GB)

(73) Assignees: The University of Surrey, Surrey (GB); The Forestry Commission, Edinburgh (GB)

( * ) Notice: Subject to any disclaimer, the term of this patent is extended or adjusted under 35 U.S.C. 154(b) by 96 days.

(21) Appl. No.: 13/955,978

(22) Filed: Jul. 31, 2013

(65) Prior Publication Data
US 2013/0316898 A1 Nov. 28, 2013

Related U.S. Application Data

(63) Continuation of application No. PCT/GB2012/050218, filed on Feb. 2, 2012.

(30) Foreign Application Priority Data

Feb. 3, 2011 (GB) .................................. 1101864.5

(51) Int. Cl.
| | |
|---|---|
| *B01J 20/20* | (2006.01) |
| *B09C 1/08* | (2006.01) |
| *B01J 20/02* | (2006.01) |
| *B01J 20/06* | (2006.01) |
| *B01J 20/10* | (2006.01) |
| *B01J 20/28* | (2006.01) |
| *B01J 20/32* | (2006.01) |
| *B01J 20/04* | (2006.01) |
| *B01J 20/30* | (2006.01) |
| *C02F 1/28* | (2006.01) |
| *C02F 101/10* | (2006.01) |
| *C02F 101/20* | (2006.01) |
| *C02F 103/06* | (2006.01) |
| *C02F 1/48* | (2006.01) |

(52) U.S. Cl.
CPC ............... *B09C 1/08* (2013.01); *B01J 20/02* (2013.01); *B01J 20/0248* (2013.01); *B01J 20/0277* (2013.01); *B01J 20/0285* (2013.01); *B01J 20/0292* (2013.01); *B01J 20/041* (2013.01); *B01J 20/043* (2013.01); *B01J 20/045* (2013.01); *B01J 20/06* (2013.01); *B01J 20/10* (2013.01); *B01J 20/20* (2013.01); *B01J 20/28042* (2013.01); *B01J 20/28057* (2013.01); *B01J 20/28073* (2013.01); *B01J 20/28085* (2013.01); *B01J 20/28097* (2013.01); *B01J 20/3078* (2013.01); *B01J 20/3204* (2013.01); *B01J 20/3236* (2013.01); *C02F 1/288* (2013.01); *C02F 1/281* (2013.01); *C02F 1/283* (2013.01); *C02F 1/488* (2013.01); *C02F 2101/103* (2013.01); *C02F 2101/20* (2013.01); *C02F 2103/06* (2013.01); *C02F 2209/06* (2013.01); *C02F 2303/16* (2013.01)

(58) Field of Classification Search
CPC .................................. B01J 20/02; B01J 20/20
See application file for complete search history.

(56) References Cited

U.S. PATENT DOCUMENTS

| | | | | |
|---|---|---|---|---|
| 1,519,470 | A | * | 12/1924 | Wilson .................. C01B 31/125 252/189 |
| 3,876,451 | A | | 4/1975 | Zall |
| 4,877,920 | A | | 10/1989 | Lush |
| 4,970,145 | A | | 11/1990 | Cambridge |
| 6,277,780 | B1 | | 8/2001 | Beckler |
| 7,425,521 | B2 | * | 9/2008 | Kaiser .................... B01D 53/02 423/460 |
| 7,767,007 | B2 | * | 8/2010 | Chao ...................... B01D 53/10 502/417 |
| 2004/0089608 | A1 | | 5/2004 | Vo |
| 2007/0080115 | A1 | | 4/2007 | Sylvester |

(Continued)

FOREIGN PATENT DOCUMENTS

| | | |
|---|---|---|
| CN | 101505855 A | 8/2009 |
| EP | 247241 A | 2/1926 |
| EP | 0121339 A2 | 10/1984 |

(Continued)

OTHER PUBLICATIONS

Sneeath, Helen, et al., "Remediation of metal, arsenic and phenanthrene contaminated soil using charcoal and iron fillings," Goldschmidt Conference Abstracts 2009, p. A1243.

*Primary Examiner* — Stuart Hendrickson
(74) *Attorney, Agent, or Firm* — Kilpatrick Townsend & Stockton LLP

(57) ABSTRACT

The invention relates to composite adsorbent materials, and in particular, to highly porous carbon-based composite materials for the adsorption and stabilization of inorganic substances. The composite adsorbent material comprises a porous carbon carrier matrix and an adsorbent species, wherein the adsorbent species is precipitated within the pores of the carrier matrix. The invention extends to various uses of such adsorbent materials, for example in water purification, recovery of metals from waste streams and remediation applications, and where the adsorbant material is amended into soil, waste etc. for the purpose of breaking pollutant-receptor linkages.

19 Claims, 9 Drawing Sheets

(56) References Cited

U.S. PATENT DOCUMENTS

2008/0293565 A1    11/2008   Warurton
2009/0209418 A1     8/2009   Watanabe

FOREIGN PATENT DOCUMENTS

| | | |
|---|---|---|
| EP | 1010428 A2 | 6/2000 |
| GB | 2060427 A | 5/1981 |
| JP | 02052040 A | 2/1990 |
| JP | 2010253454 A | 11/2010 |
| WO | 02/069351 A1 | 9/2002 |
| WO | 2005/082523 A1 | 9/2005 |
| WO | 2007/030677 A2 | 3/2007 |
| WO | 2008/099681 A1 | 8/2008 |
| WO | 2011/016038 A1 | 2/2011 |

\* cited by examiner

Figure: 1
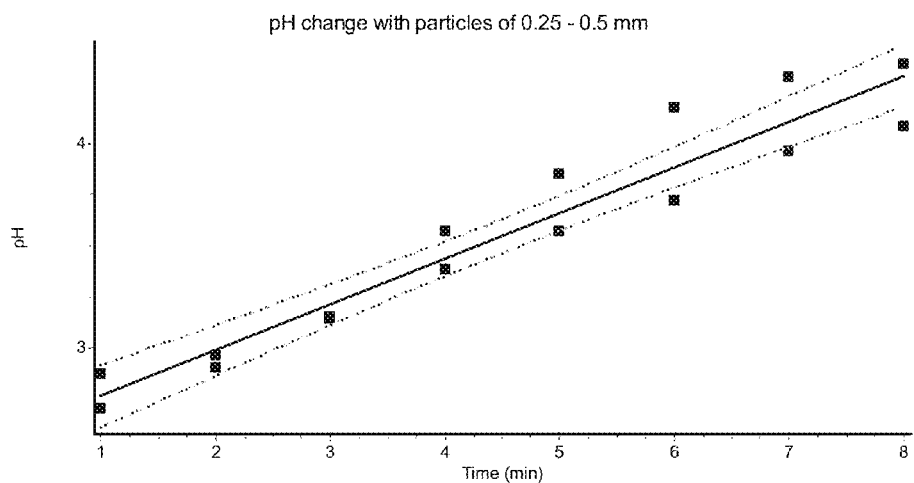
Figure: 2
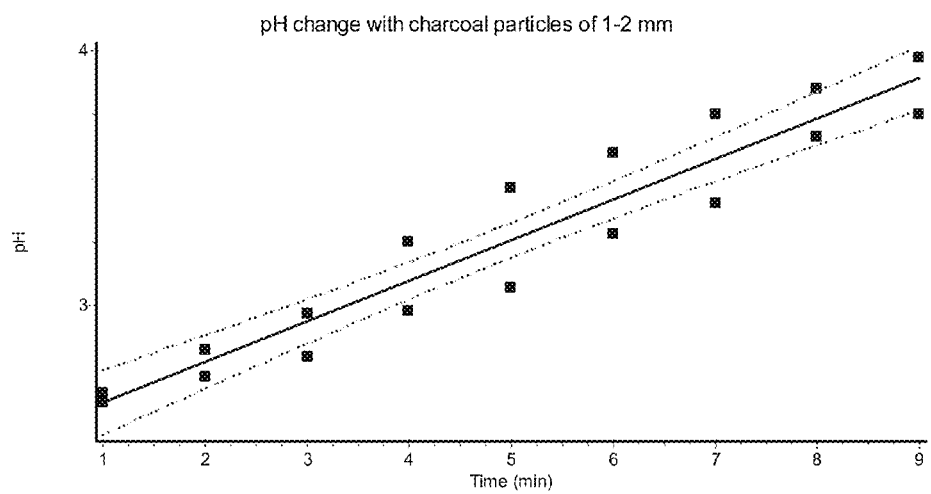

Figure: 3
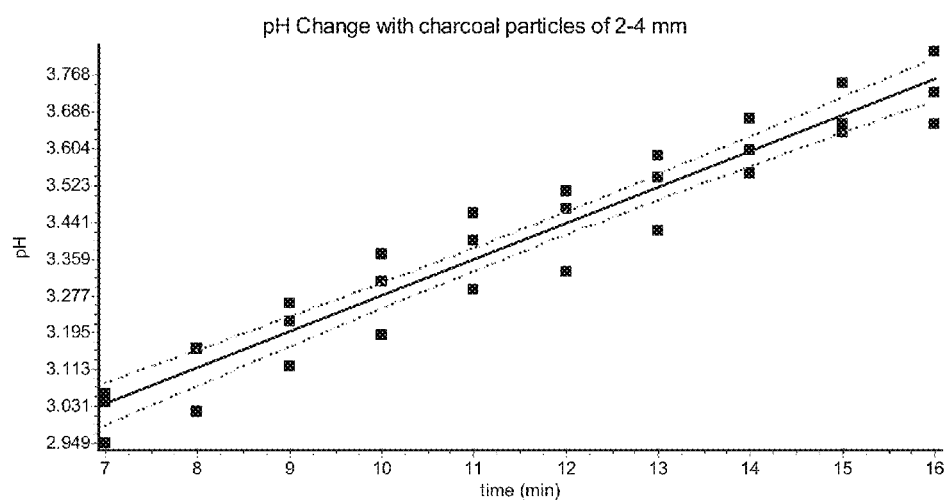
Figure: 4
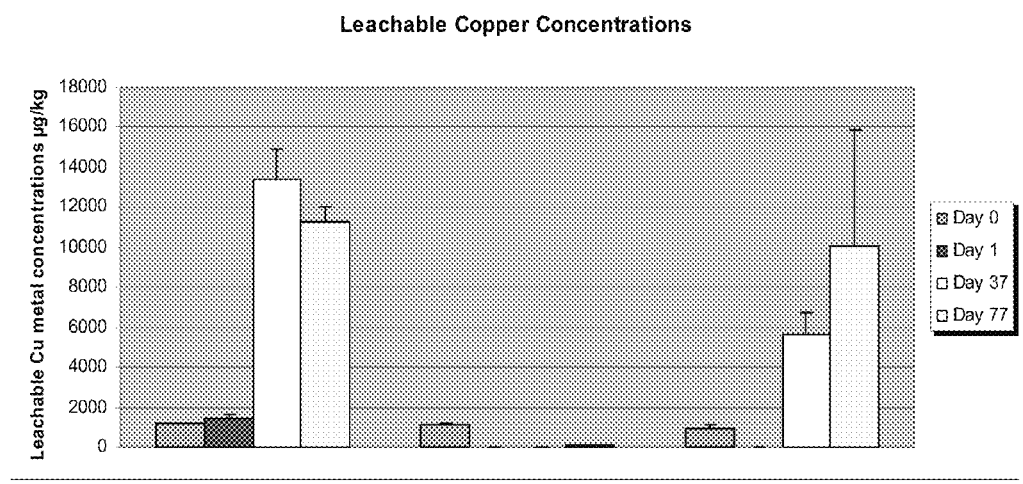

Figure: 5
(a)
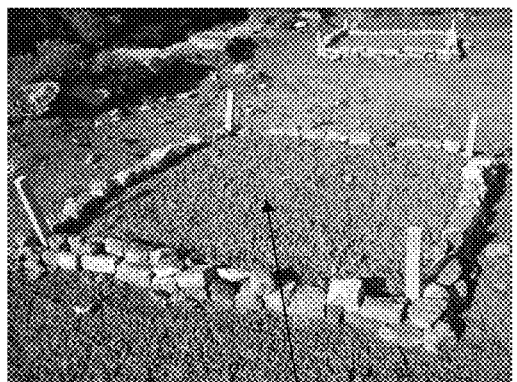
Rye grass does not grow
(b)
Rye grass has established
Figure: 6
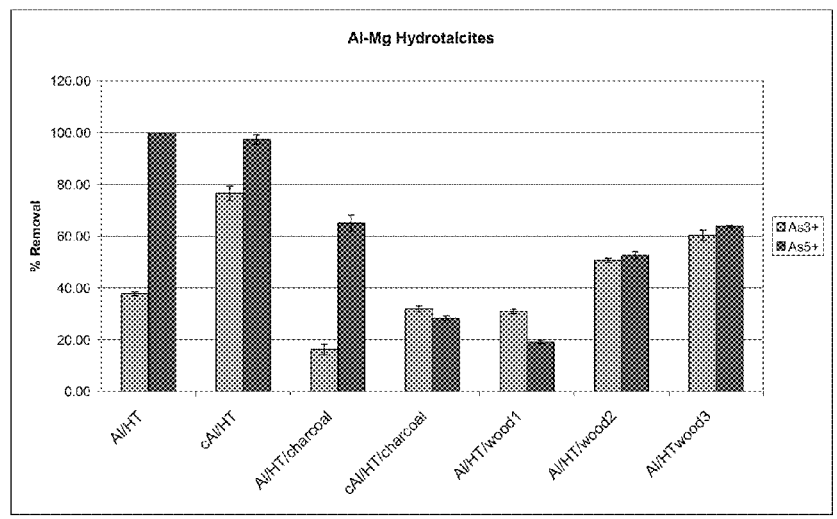

Figure: 7
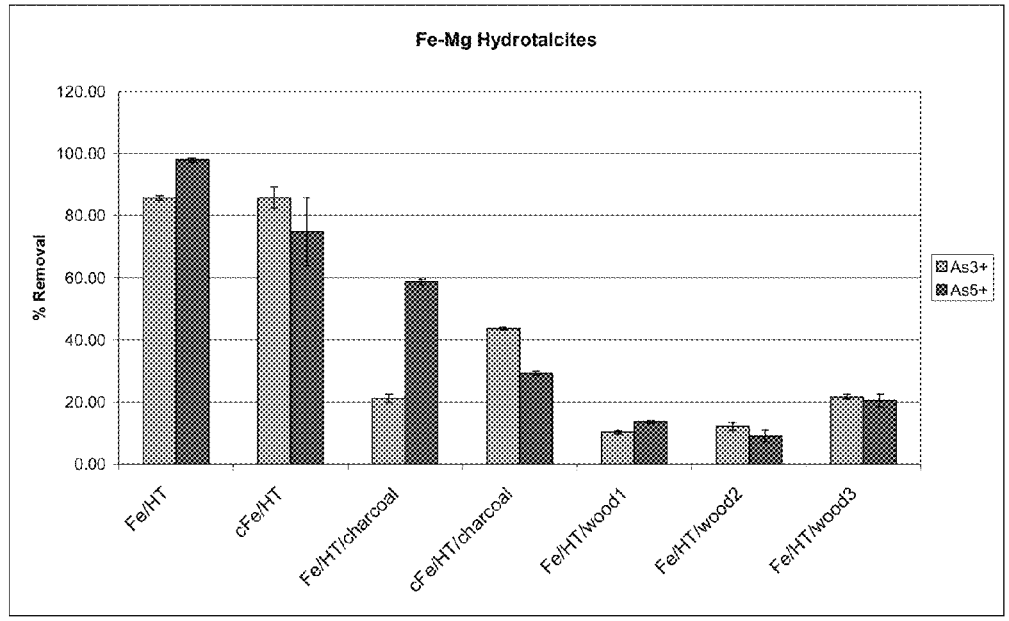
Figure: 8
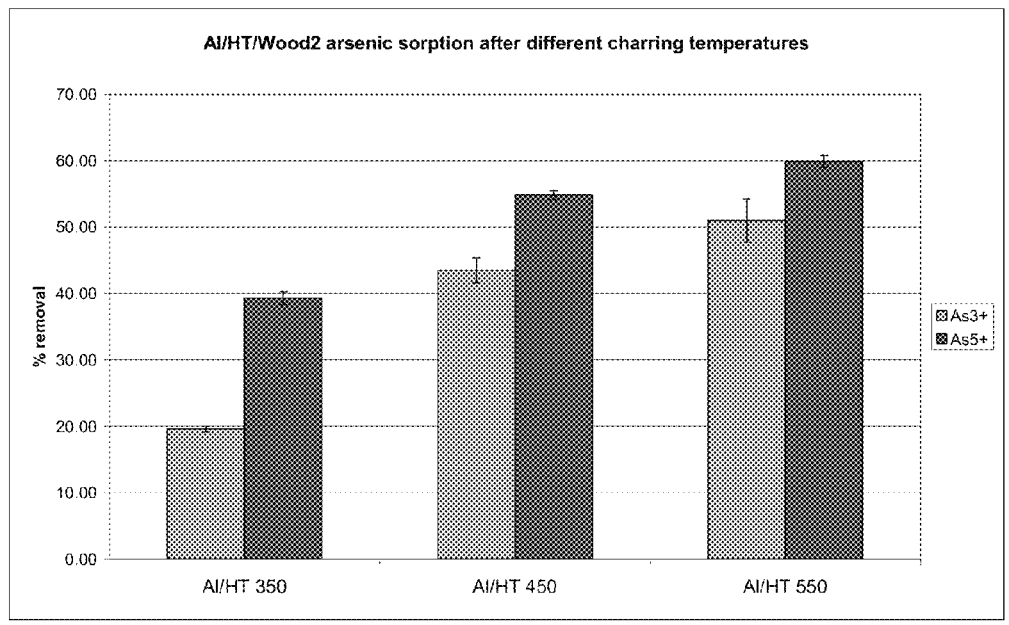

Figure: 9
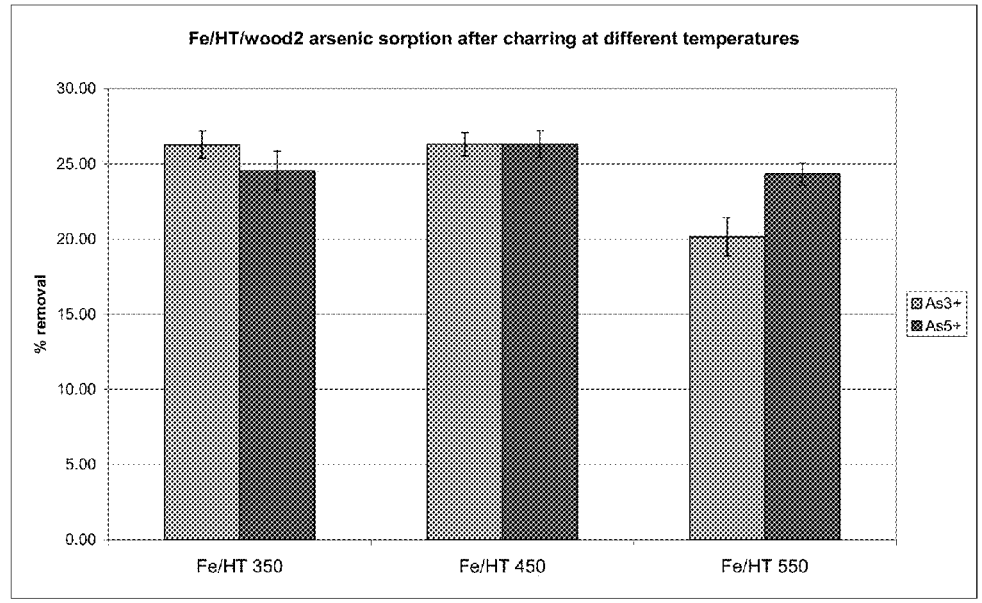
Figure: 10
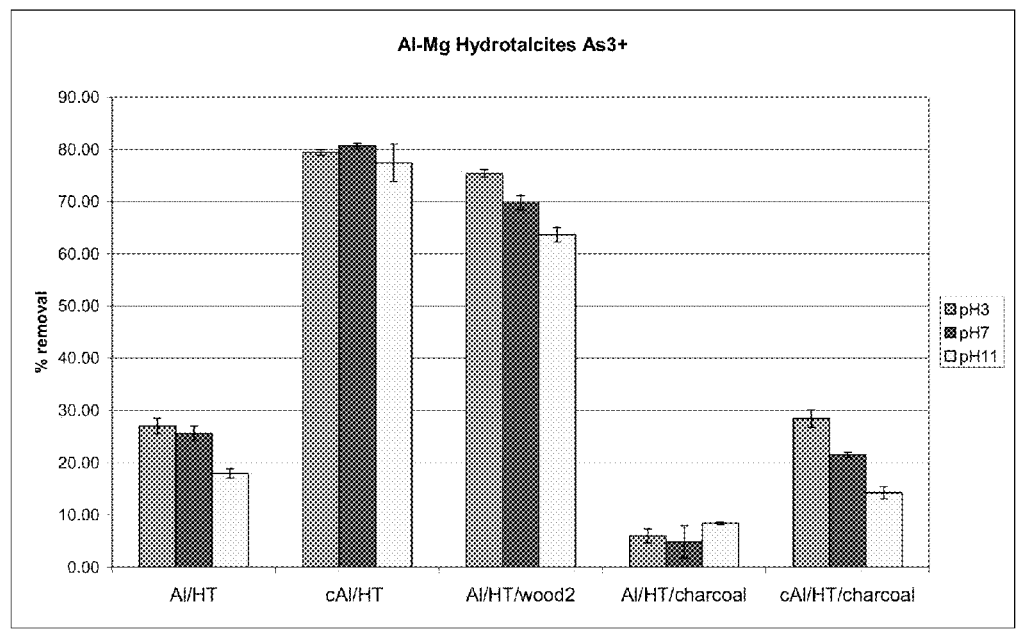

Figure: 11
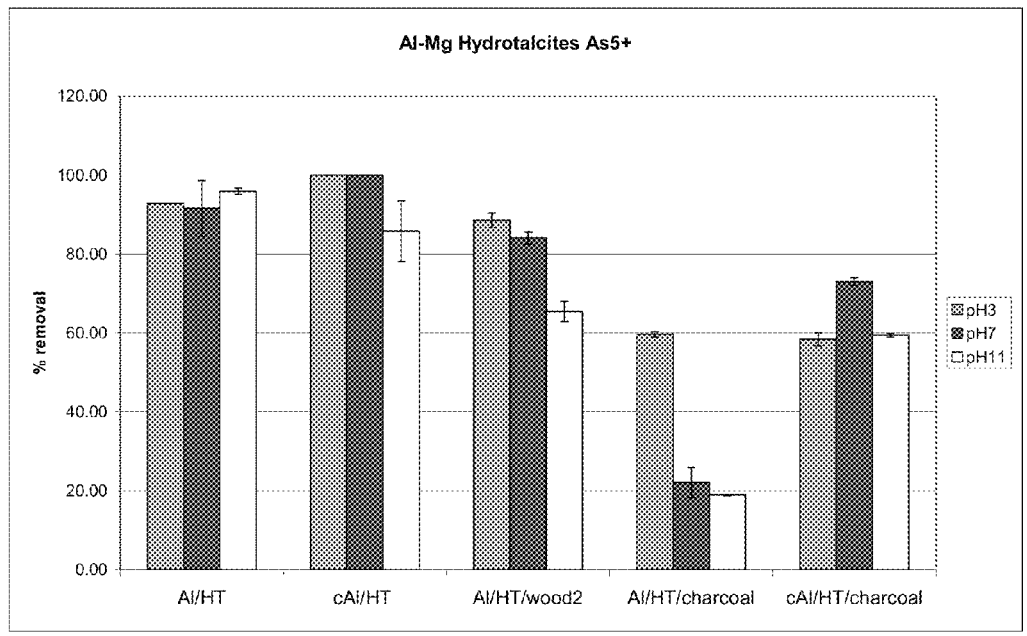
Figure: 12
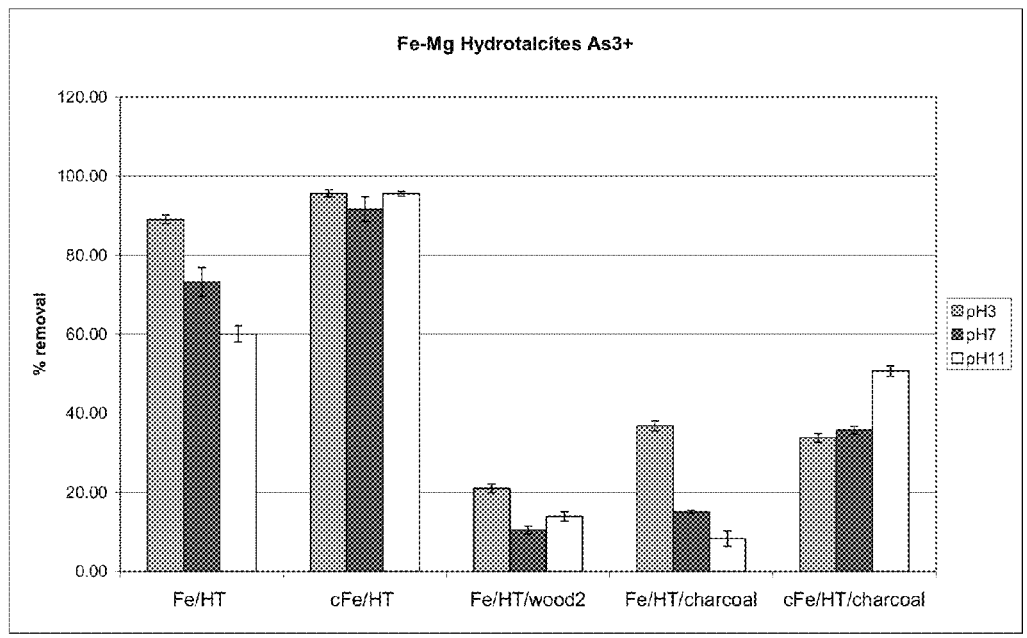

Figure: 13
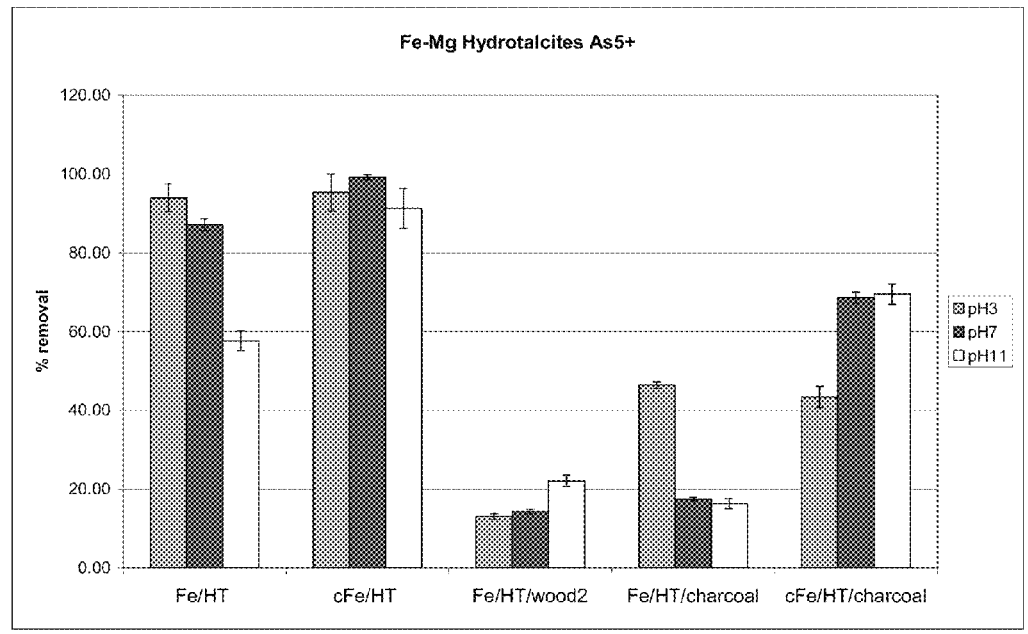
Figure: 14
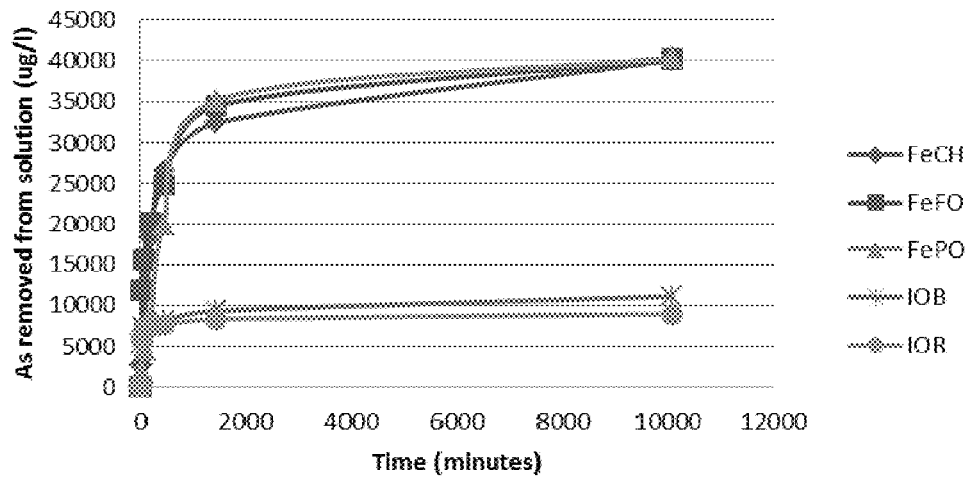

Figure: 15
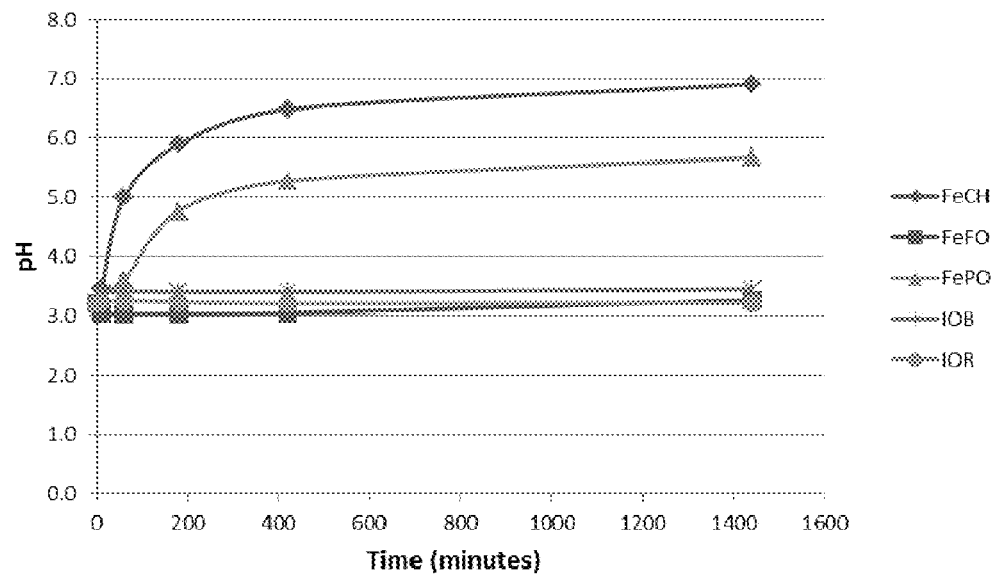
Figure: 16
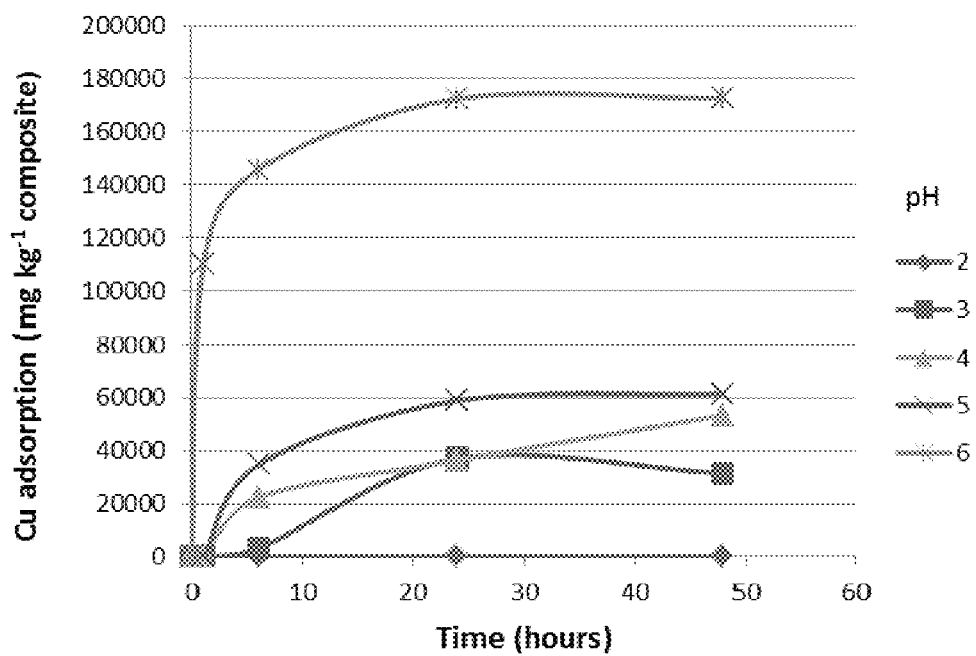

Figure: 17
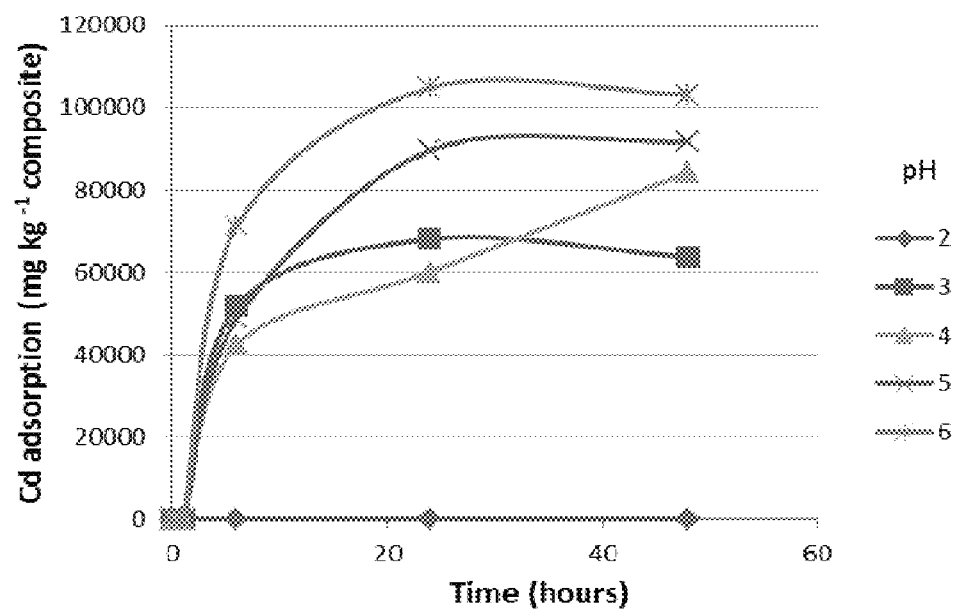
Figure: 18
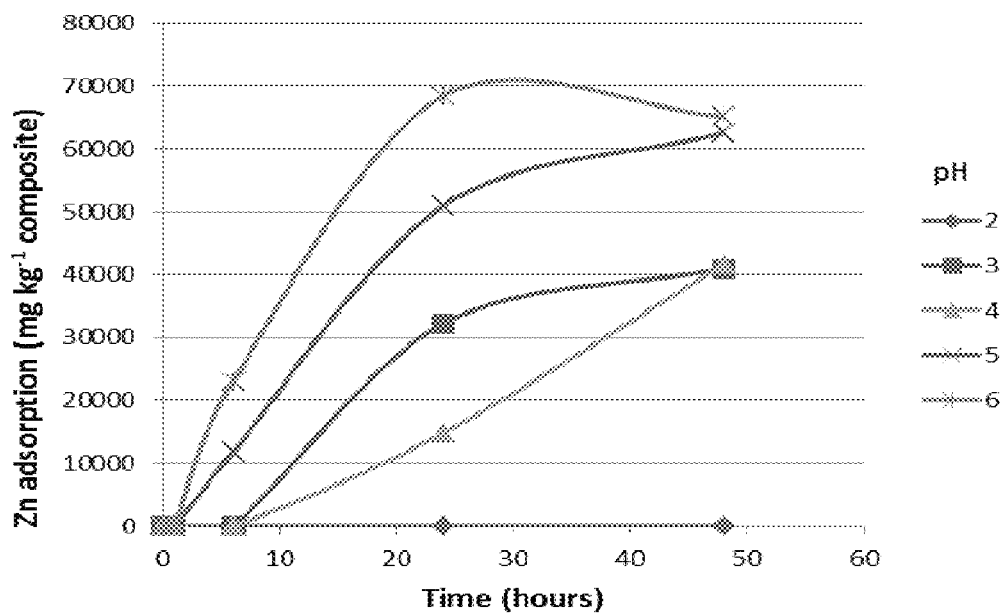

COMPOSITE ADSORBENT MATERIAL

This application is a continuation of International (PCT) Application No. PCT/GB2012/050218, filed Feb. 2, 2012, which claims the benefit of United Kingdom Application No. 1101864.5, filed Feb. 3, 2011, each of which is herein incorporated by reference in its entirety and for all purposes.

The present invention relates to composite adsorbent materials, and in particular, to highly porous carbon-based composite materials for the adsorption and stabilisation of inorganic substances. The invention extends to particles and aggregates comprising such adsorbent materials, and their uses in water purification, recovery of metals from waste streams and remediation applications, and where the adsorbent material is amended into soil or waste etc. for altering its pH, and for the purpose of breaking pollutant-receptor linkages.

Composite materials that are developed for cleaning blood (humor) are described in EP1010428A. The pores of a porous material are coated with an adsorbent to remove impurities from the blood with the advantage of the coated pores affording better contact between the adsorbent and the blood. A similar mechanism is described in GB2060427A, where a porous matrix is coated with a catalysts, such as metal oxides, sulphates, carbonates or elementary metals such as cobalt, copper, iron, nickel, bismuth, lead or silver to obtain a material that has enhanced capacity to remove ozone from the atmosphere. JP2052040 describes a porous matrix (either activated carbon or activated alumina) that is impregnated with a cupric salt and a reducing agent to create a product that is useful for the removal of ethylene. JP2010253454 describes a polymeric material that is rich in cationic groups and can be used for the removal of oxyacids. U.S. Pat. No. 790,145 describes a porous matrix that is coated with an enzyme where the porous matrix can be platinum or a heterogenous layer of resin bound carbon or graphite particles. All of these inventions have in common that the products described have enhanced activity because they all use thin coatings of the large surfaces that are present in a porous matrix to maximise contact between the 'active chemicals' that are present in the coating and the fluids or gases that are passed through them.

Others have described methods that aim to extend the use of activated carbons by making them harder and increase their surface area (GB247241), change their pore structure from meso-porous to micro-porous by impregnation with silica gel (US20090209418) or by impregnating activated carbons with iron particles allowing the thus impregnated activated carbons to be recovered more effectively from slurries using magnets (WO02069351). Here, the adsorbent properties of the activated carbon itself remain key to their application.

Heavy metals, metalloids and other contaminants that are present in soil, effluents and sewage sludge can pose major environmental problems if there is a pathway by which they can reach receptors such as ground and surface waters, humans or ecosystems. For example, arsenic is a common contaminant in mining areas and is currently a significant problem in South America and South East Asia, in places where contaminated ground water is extracted for drinking. Effective, cheap and sustainable methods that allow adsorption of harmful metals, arsenic and bromates would therefore be very useful as a means for decontaminating substances that contain potentially harmful quantities of these pollutants. Similarly, compositions are required for the effective capture of radionuclides from contaminated water and sludges.

Known compositions that can be used for adsorbing toxic compounds include particles of porous adsorbent species, such as silicate materials, or activated carbon particles which have been coated on their outer surface with adsorbent species (e.g. silicates). However, a problem with these known adsorbent materials is that because the adsorbent species are only present on the outer surface of the particles, in use, they are exposed directly to the surrounding fluids containing the contaminants, and so their stability and thus activity under adverse conditions is significantly compromised. A further problem is that, because the adsorbent species are present on the surface of the particles, they are susceptible to abrasion, such that the adsorbent is removed, resulting in a further loss in efficacy. Also, because the adsorbents themselves are not within the confines of a porous matrix, they are not capable of significantly modifying the micro-environment within the particles onto which they are coated.

Conditioning or "amendment" of soils with chemicals that form insoluble metal salts such as calcium carbonates, calcium silicates and calcium hydroxides are well-known methods to reduce metal toxicity in heavy metal contaminated soils. The addition of calcium carbonate or calcium hydroxide to soil is known as 'liming', and the addition of silicates in the form of Portland cement is known as 'cement stabilisation', in which contaminated soil is solidified by transforming it into concrete. The mode of action for these soil amendments is thought to be two-fold. Firstly, the soil amendments themselves raise the pH of the soil generally, resulting in the formation of insoluble metal hydroxides and metal oxides. Secondly, since the amendments are normally in the form of a calcium salt, the calcium ion is displaced by a heavy metal ion with the resulting heavy metal salt being more stable than the calcium salt.

However, one problem with these soil conditioning methods using cement-like products is that they form aggregates that are damaging to the soil's structure, even at low concentrations. Another problem is that the amendments are very unstable at low pH. For example, for carbonates, a pH of about only 7.0 results in the disintegration of the carbonate into carbon dioxide and the release of heavy metal ions. In addition, the more acidic the soil is, the quicker this reaction is. In acid-generating soils, these methods therefore only give temporary relief. Alternatively, by adding large quantities of lime, metals are immobilised, but the pH of the environment is raised to such an extent that plant growth and microbial activity are impeded. Addition of larger particles, in the form of limestone chips has the disadvantage that only a small surface area is reactive, and the metal carbonates that form on the surfaces of these chips prevent further reactions from taking place, limiting their adsorbent capability on a weight for weight basis. Furthermore, the crust of metal carbonates that forms on the surface of such a chip is liable to erosion and subsequent rapid disintegration. Thus, methods that would significantly stabilise metal carbonates, silicates and/or oxides without compromising the reactive surface area of the adsorbent material would be extremely useful because this would result in a much longer treatment effect (proportional to the stability gain) even under acidic conditions.

The adsorbent properties of silicates and hydrotalcites are well-known, and have been used to remove heavy metals and arsenic species from waste streams, remove radionuclides, and treat soils that are contaminated with heavy metals. However, a major problem is that, in their pure form, these adsorbent materials present themselves as a fine powder with thixotropic properties when wetted. In the case of hydrotalcites for example, when used in a filter, the adsorbent particles clog together severely impeding water flow. Alternatively, when mixed with water, they produce a very fine suspension that settles out very slowly, and is almost impossible to remove by filtration.

The presence of metal carbonates, oxides and hydroxides within charcoals produced from specific biomass sources is known. Methods that would transform these carbonates, oxides and hydroxides into more stable adsorbents, such as phosphates or silicates, would be an advantage.

There is therefore a need for improved adsorbent materials, which can be used to adsorb pollutants, for example heavy metals etc, in soil, effluents and sewage.

In a first aspect, the invention provides a composite adsorbent material comprising a porous carbon carrier matrix and an adsorbent species, wherein the adsorbent species is disposed within pores of the carrier matrix and/or in void spaces formed between adjacent particles comprising the carrier matrix.

Advantageously, the inventors have developed a novel class of composite materials that have enhanced activity, not because they afford better contact between an active molecule or the environment or because the properties of the carbon itself are changed, but because of their capacity to alter the chemistry of the environment inside the composite material itself or directly surrounding it, leading to a reaction that would not take place at all, or which would take place but at a slower rate than would occur if the adsorbent was added on its own. In some embodiments, the chemical changes that take place within the confines of the porous carrier matrix (which may be in the form of a particle or an aggregate) enhance the adsorption of pollutants onto the composite material. For example, most heavy metal salts are insoluble at alkaline pH. Simply by raising the pH within the confines of a porous particle using a carbonate or silicate salt will result in the precipitation of heavy metals inside the particle, thereby concentrating them inside such a particle and effectively removing them from the wider environment without significantly changing the pH of the environment. In addition to causing precipitation of pollutants inside a composite particle by raising the pH within the composite, similar precipitation effects can be brought about by changing the redox potential within a composite particle. For example, the presence of reduced molecules within a porous matrix can result in the creation of a highly reduced environment within a particle which can result in the precipitation of bromates and arsenates, thereby concentrating them within the composite material and leading to their removal from the environment.

The adsorbent species may be incorporated inside the carrier matrix, and is preferably precipitated within the pores of the carrier matrix. Thus, the adsorbent species were not part of the carbon carrier matrix originally. In another embodiment, the composite adsorbent material may be in the form of an aggregate comprising a plurality of particles comprising the carrier matrix, wherein the adsorbent species is disposed or precipitated in the void spaces formed between adjacent particles in the aggregate.

Advantageously, the inventors have demonstrated that the composite materials of the invention may be used in a wide variety of applications, such as for addressing environmental pollution, for cleaning drinking water, or treatment of industrial and agricultural effluent, removal of heavy metals and metalloids (such as arsenic) from landfill leachate, groundwater, sewage sludge, as well as in various soil and waste amendment applications. For example, as illustrated in FIG. 5, the composite material can be used to efficiently amend a polluted soil, or a highly acidic soil, without destroying soil productivity and quality, thereby allowing plants to grow, which would not otherwise be possible. Furthermore, compared to known adsorbent compounds, the composite material of the invention can be designed with optimised pore and particle size characteristics in order to provide improved stability and reactivity. Ability to manipulate size and reaction strength of the material by choosing the most appropriate precursors also ensures that composite materials can be created that can be used in scenarios where certain flow rates need to be maintained, e.g. water filters.

As discussed below, the composite material may be used to control and modify the dynamics of the adsorption processes. It will be appreciated that adsorption involves the binding of a molecule (i.e. the adsorbate) to a site on a surface which has an affinity for that molecule (i.e. the sorbent species). Adsorption processes generally consist of two types, i.e. either physisorption (also called physical adsorption) or chemisorption (also called chemical adsorption). Physisorption describes binding which occurs as a result of weak Van der Waals forces, while chemisorption relies on the formation of chemical bonds. Chemisorption processes are heavily dependent on environmental conditions. For example, for inorganic reactions, pH and redox potential are believed to be the most critical variables for adsorption to occur.

As described in the Examples, calcium silicate will undergo a displacement reaction with divalent copper ions resulting in the formation of copper silicate, resulting in the removal of the copper ions from the solution. This process is efficient at a pH of 7, but hardly occurs at all at a pH of 5 or less. Calcium silicate is sparingly soluble, and raises the pH of any aqueous system into which it is introduced. Thus, if calcium silicate is confined within a diffusion limited micro-environment, such as the composite material of the first aspect, it will raise the pH of that environment far higher than the equilibrium pH that would otherwise be achieved by the free chemical present in an aqueous solution.

Advantageously, this phenomenon enhances the chemisorption process between the sorbent species and the adsorbate (i.e. the copper ions) within the porous matrix. Hence, the porous carbon not only acts as an efficacious support matrix for the adsorbent species that maximises the reactive surface of the adsorbent, it also serves to modify the chemical interactions between the adsorbate and the adsorbent species. The porous structure of the matrix acts to restrict diffusion allowing sparingly soluble alkaline sorbent species to raise the internal pH of the fluid within the pores, while maintaining sufficient contact with the external environment to allow access by the adsorbate.

Therefore, in one embodiment the adsorbent species may be capable of influencing the ionic composition of the surrounding aqueous phase, wherein the resultant composite material produces an internal chemical environment which is different to that outside the material. Advantageously, this allows certain adsorption reactions to take place in conditions which would not normally be favourable to such a reaction. By way of example, heavy metals can be adsorbed from an acidic environment by creating an alkaline environment inside the composite material.

Similarly, reduced iron species may be produced by first impregnating wood with an iron salt (such as an iron sulphate or iron chloride) and then, after the thus impregnated wood has been dried, the iron ions may be reduced using the reducing power of the charring process itself. Other soluble metal salts may be used as well, including zinc salts and copper salts to obtain reduced metal species within a charcoal matrix. The thus created metal (i.e. a char composite) represents a highly reduced environment that is exceptionally effective at removing anions, such as arsenate and bromate, from water and waste streams (See the examples). Using the reducing power of the charring process, soluble metal and alkali-metal sulphates may be reduced to metal sulfides which are insoluble and useful as metal adsorbents.

Besides metal sulphates and chlorides, metal nitrates are very soluble as well and may be used to impregnate wood before charring. However, nitrates tend to act as extremely effective electron acceptors during the charring process leading to potential explosion hazards.

Due to the diffusion limitations created by the internal pore structure of the carrier matrix, dissolution of a sparingly soluble adsorbent species would require a very long period of time compared to the time that it would take to dissolve the same adsorbent in the absence of the matrix. Advantageously, therefore, during the extended period for which the composite material of the first aspect is stable, adsorption may take place unhindered even in environments that are not normally conducive to the adsorption process in question (see examples). Indeed, as described in the Examples, in field trials, silicate-containing carbons have been shown to retain heavy metals even when the pH of the soil approaches pH 2. Although the inventors do not wish to be bound by theory, they hypothesise that the primary condition for this mechanism may be that the adsorbent species is significantly less soluble than the adsorbate, and as a result, there will tend to be an accumulation of adsorbate within the confines of the porous structure of the matrix.

Other reactions that would stabilise compounds within a composite material are those that result in the production of a gas. For example, reaction of a carbonate with an acid will result in the formation of carbon dioxide. If the carbonate is in a free form (i.e. not incorporated within a porous matrix), then this carbon-dioxide would rapidly diffuse. However, advantageously, within a porous structure, the carbon dioxide gas would form gas pockets, thus creating an effective barrier preventing further diffusion of the adsorbed molecules, thereby effectively trapping them inside the composite material.

The composite material comprises an existing material (i.e. the porous structure of carbon) as a matrix to create a particle with a large reactive surface area. The reactive properties of the composite material are determined by the presence of the adsorbent species that may be precipitated (i.e. encapsulated) within the pores of the matrix, or located within void spaces between adjacent carrier matrix particles forming an aggregate. The maximum capacity of the composite material created to adsorb adsorbate ions is determined by the nature and quantity of the adsorbent species that is precipitated within the pore structure of the carrier matrix, provided that porosity is maintained. Accordingly, if the pores in the matrix are blocked because of over-impregnation with the adsorbent species, the composite material may not be able to reach its maximum adsorption capacity. The reactivity of the composite material is determined by the particle size of the carbon matrix and the size of its pores. Source materials used as the matrix may therefore be chosen or modified to give specific properties in terms of reactivity and stability of the resultant material.

A porous composite material may be created by mixing charred material containing calcium oxides, calcium hydroxides, calcium sulphates or calcium carbonates with a solution of potassium silicate. Oxides, hydroxides, sulphates and carbonates formed with other alkaline earth metals such as Magnesium are also effective, as well as true metals that are low down in the reactivity series such as Zinc. Once mixed, the potassium in the potassium silicate will be displaced by calcium and/or magnesium forming an insoluble calcium or magnesium silicate. Using small particles of charred material within the mix will result in the formation of aggregates that, when dry, are porous with excellent metal adsorbing properties (See examples).

The composite material of the invention is distinguished from known adsorbent materials, such as porous silicate particles or activated carbon particles coated with silicate, because, in the composite material of the invention, the adsorbent species is incorporated inside or within the carbon matrix itself, whereas, in known materials, only the outer surface of the particles are coated with adsorbents, such as silicates. Thus, the composite material of the first aspect is far more stable, and advantageously, unlike the known materials, does not lose the adsorbent species through abrasion. Furthermore, precipitation in the pores of the matrix allows a very high surface area to be maintained allowing maximum adsorption while the maintenance of an alkaline or reduced environment will result in a greater adsorption capacity of the adsorbent than would be expected from just the quantity of adsorbent within the composite (See examples).

The composite material of the first aspect may take the form of a highly porous carbon matrix where the pore structure of the matrix itself is used to contain a chemically distinct adsorbent species. Precipitating the adsorbent species within the pores of the carbon matrix alters the kinetics of any reaction between chemical species dissolved in fluids in which the composite material is immersed and the adsorbent species within the carbon matrix. Thus, by varying the pore size distribution within the carbon material and the percentage loading of the adsorbent species, one may optimise the behaviour of the adsorbent for a specific purpose or environment. Hence, increasing the percentage loading of adsorbent-by-mass changes the rate of adsorption/desorption due to diffusion limitation within the pores in the carbon matrix.

For example, raising the percentage loading of adsorbent species within the matrix increases total adsorption capacity for the composite material. Alternatively, reducing the percentage loading of adsorbent species within the matrix increases the available reaction surface at the expense of sorption capacity. Thus, it is possible to produce a composite material having a modest overall capacity but with a fast rate of reaction, or produce a composite material which has a slower reaction rate, but with a very high capacity.

The concentration of the carrier matrix in the composite material may be between 10-99% (w/w) or between 30-95% (w/w) of the total weight of the composite material.

Preferably, the concentration of the carrier matrix in the composite material may be between 50-90% (w/w) of the total weight of the composite material. The carrier matrix may comprise or be derived from a cellulosic precursor material, preferably a ligno-cellulosic precursor material. For example, the carrier matrix may comprise, or be derived from, plant material, compost or woody plant material. The carrier matrix may comprise or be derived from charred plant material or charred compost.

The carrier matrix may comprise or be derived from a charred hardwood or softwood species of plant. The carrier matrix may comprise charcoal, and preferably charcoal particles. The carrier matrix may comprise or be derived from any hardwood species of plant. For example, this may be the case in embodiments where the internal macro-pores of charcoal are used for deposition of the adsorbent. Alternatively, the carrier matrix may comprise or be derived from a softwood species, for example a conifer. Other source materials that are suitable as a carbon carrier precursor are those derived from bamboo. In the Examples, sweet chestnut wood has been used as the precursor material. The carrier matrix may comprise charred material, such as charcoal. If the charcoal is mixed with for example potassium silicate, then a range of charred materials is possible, including, charred plant leaves and stems, charred green waste compost, charred compost like output (CLO), charred straw derived from oil seed rape, or a cereal or any other charred material with a high mineral content. In embodiments where the mineral content of the char is low, minerals may be added in the form of calcium hydroxide, calcium carbonate, calcium sulphate or calcium oxide or a magnesium salt before mixing with a potassium silicate solution.

The carrier matrix may comprise activated or non-activated carbon. Non-activated carbon may or may not be preferred.

In embodiments where the carrier matrix is an activated carbon, it may be microporous or mesoporous. Pores in an adsorbent material are called "micropores" if their pore size is less than 2 nm in diameter, and pores are called "mesopores" if their pore size is in the range of 2 to 50 nm in diameter. Powdered and granulated activated carbons may be mixed with an insoluble calcium or magnesium salt before mixing with a solution of potassium silicate to form an aggregated composite material that, after drying, may form a hard particle with a range of adsorbent properties including heavy metal adsorption and adsorption of hydrocarbons.

The carrier matrix may be substantially macroporous, for example if the adsorbent is to be deposited inside existing pores. Pores in an adsorbent material that consists of charcoal are called "macropores" if their pore size is greater than 50 nm in diameter. It is envisaged that macropores having diameters greater than 500 nm do not usually contribute significantly to adsorbency of porous materials. Therefore, for practical purposes, pores having diameters in the range of 50 nm to 500 nm, more typically 50 to 300 nm, or 50 to 200 nm, may be classified as macropores. Non-activated carbons have normally a pore structure that is dominated by macropores.

The concentration of the adsorbent species in the composite material may be between 1-90% (w/w) or between 10-75% (w/w) of the total weight of the composite material. Preferably, the concentration of the adsorbent species in the composite material may be between 20-50% of the total weight of the composite material.

The adsorbent species may be precipitated within the pores of the carrier matrix using precipitation methods that will be commonly known to the skilled technician, examples of which are metathesis reactions or displacement reactions where a more reactive metal ion displaces a less reactive metal ion within a salt (R. H. Grubbs (Ed.), Handbook of Metathesis, Wiley-VCH, Weinheim, 2003). Other methods that lead to precipitation of adsorbents are reduction reactions where a soluble metal ion is reduced to an insoluble base metal. The adsorbent species may therefore be precipitated within the pores of the carrier matrix using a reduction reaction, wherein the precursor material is used as the reducing agent. Charring of organic matter creates a reducing atmosphere that leads to the formation of reduced metals, such as ferrous iron ($Fe^{2+}$) using ferric iron ($Fe^{3+}$) as a precursor or even non-valent iron (Fe) from either ferric or ferrous iron. Similarly, non-valent copper, nickel and zinc may be precipitated within the charcoal structure by soaking a cellulosic, hemi-cellulosic or lignocellulosic material with a soluble metal salt. Subsequent charring will result in the metal ions becoming reduced. The thus reduced metals will form a coating onto the carbon matrix thus producing a finely distributed metal surface with great reactivity that can be used for a large number of applications including removal of pollutants (such as arsenic and bromate), recovery of precious metals such as gold or silver.

Alternatively, particles comprising the carrier matrix may be contacted with the adsorbent species to form an aggregate. The properties of the material can be further enhanced by adjusting the charring temperature and the materials that are incorporated into the precursor. For example, soaking of 100 g of pine shavings in a 50 ml iron chloride solution (5% w/w) followed by a treatment step with potassium carbonate (50 ml of a 50% solution) followed by a drying step and charring at 800° C. resulted in a metal coated carbon matrix with a surface area of 1200 $m^2$/g.

The adsorbent species may be basic, and sparingly soluble. For example, in one embodiment, the adsorbent species may comprise a metal silicate, a metal hydrotalcite, a metal phosphate, a metal oxide, metal hydroxide, metal sulphide and/or a metal carbonate.

In another embodiment, however, the adsorbent species may comprise a silicate, a hydrotalcite, a phosphate, an oxide, hydroxide, sulphate, sulphide and/or a carbonate. Alternatively, if a reducing step is used to create a coating of the pores with a reduced metal, the metal may be manganese, zinc, chromium, iron, ferrous iron, cobalt, copper, nickel or silver. The reactivity series of metals is as follows:

K>Na>Li>Ca>Mg>Al>Mn>Zn>Cr>Fe>Co>Ni>Sn>Pb>H>Cu>Ag>Hg>Au>Pt. Hence, elements higher up displace those that come before them. Therefore, suitable adsorbents may be constructed from anything that is lower down the reactivity series to capture elements that are higher up.

For example, the carbonate may be a suitable alkaline earth metal carbonate. For example, the carbonate may be calcium carbonate or magnesium carbonate. It will be appreciated that calcium and magnesium are just two examples of carbonates that could be used. In one embodiment, the carbonate may comprise a suitable group 3 metal carbonate, such as aluminium carbonate. In another embodiment, the carbonate may comprise a suitable metal carbonate, such as zinc carbonate.

The phosphate may be a suitable alkaline earth metal phosphate. For example, the phosphate may be calcium phosphate or magnesium phosphate.

The oxide may be a suitable alkaline earth metal oxide. For example, the oxide may be calcium oxide or magnesium oxide. Again, it will be appreciated that calcium and magnesium are just two examples of oxides that could be used. Aluminium oxide or zinc oxide and even iron oxides may be used to remove specific metals that come higher up the reactivity series.

Preferably, the silicate is an insoluble silicate salt. The silicate may be a suitable alkaline earth metal silicate. For example, the silicate may be calcium silicate, magnesium silicate, aluminium silicate, zinc silicate or iron silicate. However, the higher up the reactivity series the metal within the adsorbent, the less its reactivity. The preferred silicate is therefore calcium silicate which is insoluble at neutral pH and is displaced by the maximum number of different metal ions.

The hydroxide may be a suitable alkaline earth metal hydroxide. For example, the hydroxide may be calcium hydroxide or magnesium hydroxide. The hydroxide may comprise a suitable group 3 metal hydroxide, such as aluminium hydroxide.

The sulphate may be a suitable alkaline earth metal sulphate. For example, the sulphate may be calcium sulphate. The sulphate may comprise a suitable group 3 metal sulphate, such as aluminium sulphate.

The sulphide may be a suitable alkaline earth metal sulphide. For example, the sulphide may be calcium sulphide or magnesium sulphide. The sulphide may comprise a suitable group 3 metal sulphide, such as aluminium sulphide.

The hydrotalcite may be a suitable alkaline earth metal hydrotalcite. For example, the hydrotalcite may be calcium hydrotalcite or magnesium hydrotalcite. It will be appreciated that a hydrotalcite is a layered double hydroxide of general formula: $(Mg_6Al_2(CO_3)(OH)_{16}.4(H_2O))$. Hydrotalcites are effective at binding anionic metal species such as arsenite, arsenate, phosphates and iodine ions via anion exchange. Thus, positioning the hydrotalcite adsorbent species within the pores of the carbon matrix provides a composite material exhibiting both stability and reactivity that can be further manipulated to make products that can be easily removed from liquid media, for example using a sieve.

Thus, in one embodiment, the adsorbent species may be basic. The adsorbent species may comprise a silicate, a hydrotalcite, an oxide, a hydroxide and/or a carbonate. The adsorbent species may comprise an alkaline earth metal or metal silicate, hydrotalcite, oxide, hydroxide and/or carbonate.

In another embodiment, the adsorbent species may be reduced. The adsorbent species may comprise a reduced metal species. The reduced metal may comprise a reduced species of manganese, cobalt, copper, zinc, iron, nickel, bismuth or silver. The reduced metal may comprise a metal sulphide. The reduced metal may comprise elementary manganese, cobalt, copper, zinc, iron, nickel, bismuth or silver.

In another embodiment, the adsorbent species may be acidic. The adsorbent species may comprise a phosphate or sulphide.

As described in the examples, in some embodiments of the invention, non-activated charcoal may be used as the matrix into which is precipitated a silicate salt or a layered-double hydroxide, i.e. a hydrotalcite. The incorporation of silicates, phosphates, sulphates, oxides, carbonates, sulphides or hydrotalcites into a macroporous carbon matrix allows the production of a friable, and easy to handle material that can be used in filters, mixed with water to adsorb pollutants, or can be amended to soil without negatively affecting soil properties. Silicate salts, such as magnesium silicate and calcium silicate, are exceptionally effective at adsorbing heavy metal cations that are placed higher up in the reactivity series than calcium or magnesium via a displacement reaction to form metal silicates.

As discussed previously, when in pure form, silicates and hydrotalcites form a fine powder having thixotropic properties when wetted. Thus, when hydrotalcites are used, for example in a filter, the powder will clog up the filter, thereby impeding water flow.

Further, even at small concentrations in soil amendment applications, silicates form aggregates that are damaging to the soil's structure. However, in the composite material of the invention, the pores of the carbon matrix are coated with a thin layer of silicates (or hydrotalcites), which allows free flow of water, which does not form a fine suspension. Hence, the composite material does not react with soil particles to form 'concrete', and still maintains its ability to immobilise specific ions.

When silicates, oxides, carbonates or hydroxides are directly added to soil as a fine powder the amendment will change the pH of the whole soil environment. This can lead to the creation of alkaline conditions under which plants cannot grow. By incorporating these adsorbents into a porous matrix, the change in pH is limited to the porous particle itself leaving the bulk of the soil unchanged, thus allowing plants to thrive.

By using a porous carrier matrix, such as wood charcoal, it is also possible to alter the properties of the composite materials by precipitating different chemical species having desired properties into its pore structure. For example, in one embodiment, iron oxide or iron hydroxide or elementary iron may be introduced into the pores of the composite material via precipitation or reduction reactions. It will be appreciated that the resultant material will exhibit magnetic properties allowing it to be removed effectively from slurries and liquid media using magnets.

The surface area of the composite material used in accordance with the invention is closely determined by the proportion of adsorbent species and the matrix formed during the precipitation step from its precursor. The surface area of the pores (preferably macro-pores) of the material may be at least $0.5 \text{ m}^2 \text{ g}^{-1}$. However, it is preferred that the composite material has a pore surface area of at least $2 \text{ m}^2 \text{ g}^{-1}$, more preferably at least $3 \text{ m}^2 \text{ g}^{-1}$, even more preferably at least $4 \text{ m}^2 \text{ g}^{-1}$, and most preferably at least $5 \text{ m}^2 \text{ g}^{-1}$. In embodiments where the matrix is an activated carbon, combined meso- and micro-pores are commonly between 200 and $2000 \text{ m}^2 \text{ g}^{-1}$. The surface area can be measured by the (Brunauer, Emmett, and Teller) "BET method" as described by Kantro, D. L., Brunauer, S., and Copeland, L. E. in "BET Surface Areas: Methods and Interpretations" in The Solid-Gas Interface, Vol. 1 (E. A. Flood, Ed.), Marcel Dekker, New York, 1967.

Preferably, the composite material has a macro-pore volume which is greater than $0.5 \text{ cm}^3 \text{ ml}^{-1}$, typically ranging from 0.6 to $1 \text{ cm}^3 \text{ ml}^{-1}$, and preferably about 0.7 to $0.9 \text{ cm}^3 \text{ ml}^{-1}$. The porosity may be measured by mercury porosimetry, as described in Sol-Gel Materials: Chemistry and Applications (John Dalton Wright, Nico A. J. M., Maria Sommerdijk (Ed.), P. 74, CRC Press 2001).

Preferably, the composite material has pores that have an average diameter that is greater than 10 nm, more preferably greater than 20 nm, even more preferably greater than 50 nm, and most preferably greater than 100 nm or more.

It will be appreciated that, once prepared, the sorbent composition may be used in any configuration, shape or size. For example, the composite adsorbent material may be in the form of a particle or may be shaped as an aggregate. Thus, the material may be employed in particulate form, or combined with an inert solid (monolithic) substrate to produce what is referred to in the art as a monolithic structure.

Thus, in a second aspect, there is provided a particle comprising the composite adsorbent material of the first aspect.

The particulate form of composite material may be desirable in embodiments of the invention where large volumes of adsorbent material are needed, and for use in circumstances in which frequent replacement of the material may be required. The composite material may comprise small particles, which may be contacted with a polluted fluid to be cleaned.

The mean particle size of the composite material may be between about 0.1 mm and 50 mm, or between about 0.1 mm and 25 mm, or between about 0.2 mm and 10 mm, or bigger. In some embodiments, the mean particle size of the composite material may be between about 0.1 mm and 10 mm, or between about 0.2 mm and 7 mm, or between about 0.25 mm and 5 mm. The mean particle size may be between about 0.2 mm and 1 mm, or between about 0.5 mm and 3 mm, or between about 1 mm and 5 mm. However, for very slow reacting applications that require high stability in, for example, acidic conditions, particles may be between 10 mm and 50 mm, or even larger. Large particles (for example, lumps of charcoal, charred blocks of wood etc.) that are impregnated with an adsorbent species may have exceptionally slow reaction speeds, but, as a result, could be very useful in various challenging applications.

The size of the particles may be modified to suit a specific application. For example, by increasing the size of the particle, water flow through a filter may be increased, but 'reactivity speed' may be decreased. A similar effect may be obtained by using a carbon matrix having a smaller pore size. Reducing reactivity speed can be important where a pollutant is immobilised by competing ions that are present in the environment (such as hydrogen ions). For example, as described in the Examples, copper in copper silicate is stable when exposed to a solution with a pH greater that 5.5. Below this pH, an increasing proportion of the copper ions are displaced with decreasing pH. Because both calcium and magnesium silicate act as an alkali, an environment is created within the particle that has a high pH and resists, or neutralises, to a large extent, the influx of hydrogen ions from the environment while stabilising the metal silicates that have already been formed.

This is believed to be important if the carrier matrix is impregnated with silicates, and is ingested by a bird or mammal for example. For example, 'free' metal silicates (i.e. not precipitated in the matrix) would dissolve releasing the metal ions when contacted with the acidic stomach juices. However, when embedded in the carrier matrix, a high pH will be maintained within the particles, preventing the release of heavy metals into the stomach juices, thus protecting human health, in cases where the material is accidentally ingested.

In some embodiments where a particulate form of adsorbent material is required, the material may be a loose powder. In other embodiments, the composite material may be formed into any shape, for example by shaking, passing it through a sieve, moulding and/or the application of pressure thereto. For example, the composite material may be formed into a tablet, pellet, granule, ring, or sphere, etc.

The particles may be bound together by a binder to form an aggregate comprising void spaces between adjacent particles. The binder may be or comprise the adsorbent species. The average size of void space may be between about 0.1 and 2 mm, or between 0.2 and 1 mm, or between 0.3 and 0.5 mm.

In a third aspect, there is provided use of the composite material of the first aspect or the particle of the second aspect for the adsorption of inorganic substances.

The composite material of the invention may have numerous applications, for example in the clean-up of environmental contamination or pollution; for cleaning drinking water, or treatment of industrial and agricultural effluent; for removal of heavy metals or heavy-metal containing compounds from landfill leachate, groundwater, drilling waste, mine drainage, mine spoil, or sewage sludge; in soil amendments where soil or sediment is contaminated with heavy metals or heavy metal-containing compounds, phosphates etc; or for the removal of bromates, arsenates, selenium, antimony, strontium, cyanides, chlorinated compounds, nitrates, sulphates or arsenites from contaminated media.

The term "heavy metal" can mean any of the higher atomic weight elements, which have the properties of a metallic substance at STP. For example, the heavy metal or heavy metal-containing compound that may be adsorbed by the adsorbent composite material may be selected from a group of heavy metals and metalloids consisting of arsenic, antimony, strontium, beryllium, manganese, iron, aluminium, lead, cadmium, chromium, copper, nickel, zinc, mercury, and barium. The inventors have clearly demonstrated, in the examples, that arsenic may be adsorbed by the materials of the invention.

It will be appreciated that an important use of the materials of the invention is for removing pollutants from fluids, such as water.

Hence, according to a fourth aspect of the invention, there is provided a method of removing a pollutant from a fluid, the method comprising contacting a fluid comprising a pollutant with the composite adsorbent material of the first aspect or the particle of the second aspect under conditions suitable to remove the pollutant from the fluid.

In aqueous systems, it is envisaged that the composite material may be supported on a support, for example in a cartridge or is placed inside a porous bag or a filter, or is fixed onto a solid support over which the polluted fluid may be passed. Advantageously, this would combine fast reaction times with the pollutant, but only slow or no release of the pollutant as the environment in the bag or filter is buffered against environmental changes, as well as creating a double stabilising effect, i.e. inside the composite as well as within the bag.

The method of the fourth aspect may comprise feeding the fluid to be treated to the adsorbent material, or vice versa, and allowing the material to remove the pollutant from the fluid. The term fluid is intended to cover viscous fluids, such as a sludge or a slurry.

The method may comprise a step of separating at least some of the composite material from the fluid following sorption of the pollutant. For example, the separation step may comprise the use of a filter. Alternatively, in embodiments where the composite material is magnetic, for example due to the incorporation of iron oxides/hydroxides or elementary iron, a magnet may be used to extract the suspended product.

Thus, in one embodiment, the method may comprise contacting a fluid comprising a pollutant with the composite adsorbent material according to the invention, which adsorbent material comprises elementary iron, iron oxide and/or iron hydroxide or iron, within the particle according to the invention, and allowing the adsorbent material or the particle to be removed from the fluid using a magnet.

The method may comprise a step of recovering the adsorbed pollutant from the spent adsorbent material, as it may be valuable, for example, as in the case of nickel, zinc, silver, gold or copper. The recovery step may comprise contacting the spent adsorbent material with an acid. By placing the spent composite in an acidic solution, metal ions may be released and they can then be subsequently recovered using displacement with a more reactive pure metal, for example using electro-kinetics where the metal cations accumulate at the cathode, or by using reduction reactions that lead to the formation of non-valent metal. Alternatively, the recovery step may comprise contacting the spent adsorbent material with a salt solution to release the adsorbed pollutant therefrom. For example, in embodiments where the adsorbent removes ions via ion exchange, the recovery step may comprise contacting the spent adsorbent material with a concentrated salt solution such as NaCl or $CaCl_2$, thereby regenerating the sorbent composition for treatment of fresh fluid.

In a fifth aspect, there is provided a soil or waste amendment composition comprising the composite adsorbent material of the first aspect.

The term "soil or waste amendment composition" can mean a material used for altering the pH of a soil or waste. FIG. 5 shows the effects of using the material of the first aspect as a soil amendment composition.

According to a sixth aspect, there is provided a method of preparing a composite adsorbent material, the method comprising the steps of:
  (i) providing a porous carbon carrier matrix; and
  (ii) precipitating an adsorbent species within the carrier matrix, to thereby form a composite adsorbent material.

The adsorbent material is preferably as defined in the first aspect. Preferably, the adsorbent species is precipitated within the pores of the carrier matrix.

In one embodiment, a powdered porous material containing sufficient quantities of a calcium or magnesium hydroxide, oxide or carbonate may be contacted with a soluble silicate solution (e.g. potassium silicate or sodium silicate), a phosphate salt (e.g. potassium phosphate) or phosphoric acid. The displacement reaction that follows may produce a stable adsorbent (e.g. calcium or magnesium silicate or calcium or magnesium phosphate) within a porous matrix. The material may then be contacted with a binder, if necessary, or simply dried to produce a porous aggregate. Thus, the adsorbent material may be in the form of an aggregate in which the adsorbent species is disposed in void spaces formed between adjacent particles comprising the carrier matrix.

A particularly effective way of producing a composite material with high metal adsorbent properties may be to contact char with a large mineral content (at least 5% or more by weight) with phosphoric acid. The phosphoric acid may react with the calcium and magnesium oxide, hydroxide or carbonate to form stable calcium or magnesium phosphate within the charcoal structure. The hydrogen acids that were part of the phosphoric acid may react with the hydroxides and oxides to form water. If carbonate is present, this may result in the formation of water and carbon dioxide. This process produces a material with a low pH that is capable of adsorbing metals at a pH below 4.

The resultant composite material may be as defined in relation to the first aspect. Thus, the carrier matrix may comprise, or be derived from, a cellulosic precursor material, preferably a ligno-cellulosic precursor material. For example, the precursor material may comprise wood. The precursor material may be heated (or charred) to form charcoal. For example, the material may be heated to at least 300° C., 400° C., 450° C., 500° C., 600° C., 800° C., 1000° C. or higher, preferably in the absence of oxygen. Preferably, the carrier is heated in an oxygen limited environment. Thus, the carrier matrix may comprise charcoal. The precursor may be calcined. The carbon matrix may be impregnated with a soluble salt prior to being heated resulting in the reduction and precipitation of at least one of the ions of the impregnating salt.

The particle size of the carrier matrix may be reduced, for example by breaking larger particles into smaller ones. In one embodiment, the method may comprise contacting the matrix with a solution comprising a silicate, a hydrotalcite, a phosphate, an oxide, a hydroxide, a sulphate, a sulphide and/or a carbonate, for sufficient time to allow impregnation into the pores of the matrix. In another embodiment, the method may comprise contacting the matrix with a solution comprising a silicate salt, a metal hydrotalcite, a soluble phosphate salt or phosphoric acid, a metal oxide and/or a soluble carbonate, for sufficient time to allow impregnation into the pores of the matrix. In one embodiment, the silicate salt, a metal hydrotalcite, a soluble phosphate salt or phosphoric acid, a metal oxide and/or a soluble carbonate, may be any suitable alkali or alkaline earth metal silicate salt, a metal hydrotalcite, a soluble phosphate salt or phosphoric acid, a metal oxide and/or a soluble carbonate. However, in another embodiment, the hydrotalcite, phosphate, oxide and/or carbonate may be a salt consisting of any suitable alkali or alkaline earth metal that is soluble. Preferably, the carrier matrix is contacted with a solution of a potassium or sodium salt, for example potassium silicate or sodium silicate.

To allow precipitation of the adsorbent to form an insoluble silicate, phosphate, carbonate or sulphide, the method may then comprise contacting the treated carrier matrix with a soluble alkaline earth or metal chloride, bromide, fluoride, hydroxide, nitrate or sulphate for sufficient time to allow precipitation of the adsorbent species within the pores of the carrier matrix. It will be appreciated that the potassium or sodium that formed part of the silicate, phosphate, sulphide or carbonate solution, will be displaced by the alkali earth metal or metal ions forming insoluble silicate, phosphate, sulphide or carbonate species. This process allows exceptional heavy loading of the pores with reactive chemicals.

In one embodiment of the method, the soluble silicate, phosphate, sulphide or carbonate may be contacted with the matrix first. However, in another embodiment, the method may comprise impregnating the matrix with a soluble alkali earth metal salt or metal salt first, followed by exposure to a soluble silicate, phosphate, sulphide or carbonate. The result should be the same, i.e. precipitation of an insoluble metal silicate, phosphate, sulphide or carbonate within the pores of the carrier matrix.

An added benefit of the process is that during displacement, a new salt is formed that can be collected and used for alternative applications. For example, the use of potassium silicate and calcium nitrate will result in the formation of insoluble calcium silicate in the matrix pore structure and a soluble potassium nitrate that can be collected and used as a plant fertiliser, for example.

The method may comprise washing the composite material to remove the displaced salt, e.g. potassium chloride. The method may comprise drying the material to remove moisture before use.

In a further aspect, the invention provides a composite adsorbent material comprising a porous carbon carrier matrix and an adsorbent species, wherein the adsorbent species is precipitated within the pores of the carrier matrix.

The absorbent material of the invention may require the precipitation of specific adsorbent species that are added to the carrier matrix, and precipitated within its pores.

All of the features described herein (including any accompanying claims, abstract and drawings), and/or all of the steps of any method or process so disclosed, may be combined with any of the above aspects in any combination, except combinations where at least some of such features and/or steps are mutually exclusive.

For a better understanding of the invention, and to show how embodiments of the same may be carried into effect, reference will now be made, by way of example, to the accompanying diagrammatic drawings, in which:—

FIG. 1 is a graph showing the pH change with charcoal particles of 0.25-0.5 mm;

FIG. 2 is a graph showing the pH change with charcoal particles of 1-2 mm;

FIG. 3 is a graph showing the pH change with charcoal particles of 2-4 mm;

FIG. 4 is a bar chart showing leachable copper ions 0, 1, 37 and 77 days after treatment of heavy metal contaminated acidic soil (pH 2.5). Control soil was untreated and top soil received a layer of around 2 cm of non-contaminated garden soil. N=5;

FIG. 5 are photographs showing the establishment of Rye grass on non-amended soil (FIG. 5a) and soil amended with 4% (w/w) silicate charcoal (FIG. 5b). Soils were originally acidic (pH 2.5) and contained high levels of a range of heavy metals;

FIG. 6 is a graph showing the removal of $As^{3+}$ and $As^{5+}$ ions using Al/Mg hydrotalcites in a pure form (Al/HT and cAl/HT) and charcoal products where Al/Mg hydrotalcites were precipitated within the charcoal pore structure. Table 4 summarises the abbreviations used. 25 mg product was added to 25 ml water containing 10 mg/l As. Adsorption was not adjusted for the amount of hydrotalcite in each product. N=3;

FIG. 7 is a bar chart showing the removal of $As^{3+}$ and $As^{5+}$ using Fe/Mg hydrotalcites in a pure form (Fe/HT and cFel/HT) and charcoal products where Fe/Mg hydrotalcites were precipitated within the charcoal pore structure. 25 mg product was added to 25 ml water containing 10 mg As/l. Adsorption was not adjusted for the amount of hydrotalcite in each product. N=3;

FIG. 8 is a bar chart showing the percentage removal of $As^{3+}$ and $As^{5+}$ using Al/Mg hydrotalcites precipitated in charcoal. Products were derived from pre-loaded pine wood that was subsequently charred at 350, 450 or 550° C. 15 mg product was added to 15 ml water containing 10 mg As/l. N=3;

FIG. 9 is a bar chart showing the percentage removal of $As^{3+}$ and $As^{5+}$ using Fe/Mg hydrotalcites precipitated in charcoal. Products were derived from pre-loaded pine wood that was subsequently charred at 350, 450 or 550° C. 15 mg product was added to 15 ml water containing 10 mg As/l. N=3;

FIG. 10 is a bar chart showing the percentage removal of $As^{3+}$ using Al/Mg hydrotalcites at different pH (3, 7 and 11). Hydrotalcites were either used on their own (Al/HT and cAl/HT) or derived rom pre-loaded pine wood that was subsequently charred at 550° C., or from charcoals where the hydrotalcite was precipitated within existing charcoal (Al/HT/Charcoal and cAl/HT/Charcoal) The latter was calcined at 550° C. 15 mg product was added to 15 ml water containing 10 mg As/l. N=3;

FIG. 11 is a bar chart showing the percentage removal of $As^{5+}$ using Al/Mg hydrotalcites at different pH (3, 7 and 11). Hydrotalcites were either used on their own (Al/HT and cAl/HT) or derived from pre-loaded pine wood that was subsequently charred at 550° C., or from charcoals where the hydrotalcite was precipitated within existing charcoal (Al/HT/Charcoal and cAl/HT/Charcoal). The latter was calcined at 550° C. 15 mg product was added to 15 ml water containing 10 mg As/l. N=3;

FIG. 12 is a bar chart showing the percentage removal of $As^{3+}$ using Fe/Mg hydrotalcites at different pH (3, 7 and 11). Hydrotalcites were either used on their own (Fe/HT and cFe/HT) or derived from pre-loaded pine wood that was subsequently charred at 550° C., or from charcoals where the hydrotalcite was precipitated within existing charcoal (Fe/HT/Charcoal and cFe/HT/Charcoal). The latter was calcined at 550° C. 15 mg product was added to 15 ml water containing 10 mg As/l. N=3;

FIG. 13 is a bar chart showing the percentage removal of $As^{5+}$ using Fe/Mg hydrotalcites at different pH (3, 7 and 11). Hydrotalcites were either used on their own (Fe/HT and cFe/HT) or derived from pre-loaded pine wood that was subsequently charred at 550° C., or from charcoals where the hydrotalcite was precipitated within existing charcoal (Fe/HT/Charcoal and cFe/HT/Charcoal). The latter was calcined at 550° C. 15 mg product was added to 15 ml water containing 10 mg As/l. N=3;

FIG. 14 shows the removal of arsenate (40 mg $l^{-1}$) solutions over time after amendment with 2.5 g $l^{-1}$ iron char at different states of oxidation (fully reduced: FeCH; Partly oxidised: FePO; Fully oxidised; FeFO) or amended with 2.5 g l−1 iron oxide ($Fe_3O_4$: IOB; $Fe_2O_3$: IOR). N=2;

FIG. 15 shows pH of arsenate solutions over time after amendment with 2.5 g $l^{-1}$ iron char at different states of oxidation (fully reduced: FeCH; Partly oxidised: FePO; Fully oxidised: FeFO) or amended with 2.5 g l−1 iron oxide ($Fe_3O_4$: IOB; $Fe_2O_3$: IOR). N=2;

FIG. 16 shows adsorption of copper (mg $kg^{-1}$ composite) from 500 mg $l^{-1}$ solutions of $Cu(NO_3)_2$ adjusted to pH values of 2, 3, 4, 5 and 6. Adsorption was measured after 1, 3, 6, 24 and 48 hours. (N=2);

FIG. 17 shows adsorption of cadmium (mg $kg^{-1}$ composite) from 500 mg $l^{-1}$ solutions of $Cd(NO_3)_2$ adjusted to pH values of 2, 3, 4, 5 and 6. Adsorption was measured after 1, 3, 6, 24 and 48 hours. (N=2); and FIG. 18 shows adsorption of zinc (mg $kg^{-1}$ composite) from 500 mg $l^{-1}$ solutions of $Zn(NO_3)_2$ adjusted to pH values of 2, 3, 4, 5 and 6. Adsorption was measured after 1, 3, 6, 24 and 48 hours. (N=2).

EXAMPLES

Example 1—Stabilising Effect of Charcoal on Copper Silicate at Low pH

Introduction

As discussed above, amendment of soils with carbonates, silicates and hydroxides are well-known methods to reduce metal toxicity in heavy metal contaminated soils. However, unfortunately, these methods are unstable at 'low pH' (e.g. for heavy metal carbonates, a pH of around 7 results in the disintegration of the carbonate into carbon dioxide, water and the release of heavy metal ions), and the more acidic the soil, the quicker the reaction, and so in acid-generating soils, these methods only give temporary relief.

Methods that would significantly stabilise metal carbonates, silicates and/or oxides would be extremely useful as this would, even under acidic conditions, result in a much longer treatment effect (proportional to the stability gain). It was hypothesised that wood charcoal, being of a porous nature, would allow calcium silicates embedded into the charcoal structure via a displacement reaction to react with copper ions in the environment. It was hypothesised that the resulting copper silicates inside the charcoal would be more stable at low pH because the charcoal particle would create a relatively stable micro-environment where the pH would be higher than in the surrounding solution therefore reducing the rate of dissolution of the metal salt inside the charcoal. To some extent, it was expected that larger particles would have a greater stabilising effect than smaller particles because of relative smaller 'edge effects'.

Materials and Methods

Stability of $CuSiO_3$ in Solution

To test this hypothesis, charcoal particles of different sizes were prepared from sweet chestnut wood. Sweet chestnut wood was charred at 450° C., broken up in small pieces which were passed over a set of sieves to create charcoal particles with sizes ranging from 0.25-0.5 mm, 1.0-2.0 mm and 2.0-4.0 mm. The charcoal was subsequently impregnated with liquid Potassium silicate (50% $K_2SO_3$ by weight) to obtain charcoal containing 10% $K_2SO_3$ by weight. Subsequently, this impregnated charcoal was soaked in calcium chloride to allow precipitation of calcium silicate within the charcoal. Once the potassium was displaced by calcium, the charcoal was washed thoroughly to remove the formed potassium chloride from the solution.

Thus, treated charcoal (termed 'silicate charcoal') was dried at 70° C. to remove most of the moisture and the silicate charcoal was stored in plastic bottles at room temperature. To create powdered silicate charcoal (<0.01 mm), the charcoal from the 0.25-0.5 size class was ground using a pestle and mortar.

To allow the calcium silicate to be converted into copper silicate, 18 bottles, each containing 1.07 g $CuSO_4 \cdot 5H_2O$ per liter RO water was prepared. Subsequently, three bottles for each treatment were amended with 5 g silicate charcoal and three controls were prepared by adding 0.5 g $CaSiO_3$ powder (Sigma, UK). The bottles were left for >1 week to allow equilibrium between the $CaSiO_3$ and the Cu ions in solution. Three bottles were not amended to allow determination of the actual concentration of Cu ions in the solution. In theory, sufficient $CaSiO_3$ was present to remove all the copper from the solution. To check how much Cu was actually removed from the solution samples were taken from each bottle and the copper concentration was determined using atomic adsorption (FAAS).

TABLE 1

Removal of Copper ions from a solution of $CuSO_4 \cdot 5H_2O$ (1.07 g $l^{-1}$) using an estimated 0.5 g calcium silicate in free form or deposited in the pore structure of charcoal particles of different size classes (<0.01 mm, 0.25-0.5 mm, 1.0-2.0 mm and 2.0-4.0 mm). N = 3. Different letters indicate significant differences between means at P < 0.05.

| Treatment | Cu concentration (mg $l^{-1}$) in solution ± SE | % removal |
| --- | --- | --- |
| Control | 246.9 ± 9.5 (a) | 0 |
| $CaSiO_3$ | 170.4 ± 9.9 (b) | 31 |
| <0.01 mm | 185.8 ± 3.9 (b) | 25 |
| 0.25-0.5 mm | 175.8 ± 12.9 (b) | 29 |
| 1.0-2.0 mm | 181.3 ± 7.3 (b) | 27 |
| 2.0-4.0 mm | 184.0 ± 5.2 (b) | 25 |
| Significance | P < 0.001 | |

From Table 1, it is clear that the silicate only removed between 31 and 25% of all the available copper from the solution. The copper in solution was in excess of the approximated adsorption capacity of the silicate component of the composite. This was to ensure adequate copper ions were present to determine maximum sorption capacity. The tests were carried out at a relatively low pH of 5 to demonstrate the functioning of the system under sub-optimal conditions. For comparison, a liming process would only immobilise copper cations at significantly higher pH. It also suggests that the amount of silicate in all the treatments was about equal. To check if the latter was the case, 5 g of each of the silicate charcoals was ashed at 600° C. and the mineral content weighted. A non-silicate charcoal was used as a control. Results in Table 2 suggest that the amount of silicate in each treatment was comparable (around 10% difference).

TABLE 2

Ash and silicate content in silicated and non-silicated charcoal with different particle sizes. 5 g charcoal was used for each assessment.

| Treatment | Ash content (g) | Silicate content (g) | % silicate |
| --- | --- | --- | --- |
| Control | 0.45 | 0 | 0 |
| 0.25-0.5 mm | 0.88 | 0.43 | 8.6 |
| 1.0-2.0 mm | 1.04 | 0.59 | 11.8 |
| 2.0-4.0 mm | 0.93 | 0.48 | 9.6 |

After 3 months, the remaining copper sulphate solution was separated from the solid fraction either by pouring of the liquid leaving a layer of fine powder stuck to the bottom of the flask (control and finely ground charcoal) or by passing the suspension over a fine sieve, followed by a quick rinse of the charcoal with RO water. All the treatments remained saturated.

To test the stability of the silicate in the different treatments, each of the materials recovered from each flask was mixed with 100 ml HCL with a pH of 2. Since there was excess silicate each of the treatments, there was ample silicate to react with the acid and reach equilibrium at a pH of 5.2 according to the following reaction:

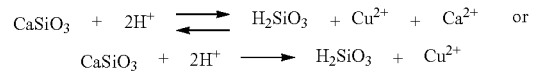

$$CaSiO_3 + 2H^+ \rightleftharpoons H_2SiO_3 + Cu^{2+} + Ca^{2+} \text{ or}$$
$$CaSiO_3 + 2H^+ \rightarrow H_2SiO_3 + Cu^{2+}$$

The speed with which the silicates react with the acid is reflected in the speed by which the pH of the solution changes. Using constant stirring, the pH of each solution was measured with a pH meter, by measuring the time it took for the suspension to reach a pH of 4.5 and then 5.0. Also, pH readings were taken every minute until the solution reached a pH>4.5. To reach a pH of 5.0, some treatments took many hours and solutions were measured hourly the next day till a pH of 5.0 was reached.

Field Experiment Parys Mountain

In this experiment, the silicate charcoal was prepared using oak charcoal fines with sizes between 0.5 and 2 cm. The charcoal was treated first with sodium silicate and subsequently with calcium chloride to obtain around 20% calcium silicate by weight inside the charcoal.

The soil at Parys mountain was extremely acidic (pH 2.5) and contained a range of heavy metals (Arsenic (>770 ppm), copper (>1,100 ppm), zinc (>2,400 ppm), lead (>2,600 ppm) and iron (>300,000 ppm).

Three different treatments were compared: Control (no amendment), top soil (2 cm) covering the contaminated soil and silicate charcoal at a rate of 4% by weight. For each treatment a plot measuring 2 by 2 meters was established. To monitor phyto-toxicity each plot was sown in with rye grass (*Lolium perenne*) and germination and plant growth was monitored over the following 77 days. Also leachable metals were monitored using the British Standards Method (BSI 2002) immediately after treatment (t=0), 1 day after treatment, 37 days after treatment and 77 days after treatment. Five samples were taken from each plot and analysed separately using ICP analysis.

Results
Stability of Silicate in Solution

Control: pH change of solution of HCl with pH of 2 when amended with an equivalent quantity (0.5 g$^{-1}$ 100 ml$^{-1}$) of silicate was on average 10.7±0.7 pH units per minute (n=3).

Referring to FIGS. 1-3, there are shown the change of pH of solution of 100 ml HCl with a pH of 2 when amended with 5 g of silicate charcoal with a particle size of 0.25-0.5 mm (FIG. 1), 1-2 mm (FIG. 2) or 2-4 mm (FIG. 3). Charcoal contained around 10% (0.5 g) $CuSiO_3$ by weight. n=2 or 3. From these three graphs, it can be seen that at low pH there is a steady reaction of the silicate trapped within the charcoal. Even charcoal particles with a size between 0.25 and 0.5 mm slow the rate at which silicate reacts with acids down by around 50 fold. Larger particles (2-4) mm have a more stabilising effect and compared with 'free silicate' are more than 100 times more stable at a pH below 4.

FIGS. 1-3 suggest that the reaction of silicate occurs at a low pH (i.e. between 3 and 4). The relation between pH and particle size is more or less linear, but since pH is on a log scale, the release of ions is in fact log linear decreasing exponentially if the pH rises. The inventors have found that the reaction stops completely at pH 5.2, meaning that no copper appears to be released from the charcoal at pH>5.2.

Whereas the release of ions from charcoal is log linear at low pH, the charcoal itself increases the stability of the bound metal even further when the pH increases relative to the control (see Table 3) below.

TABLE 3

Reactivity of silicate embedded in charcoal particles of different sizes compared with free copper silicate (control) at increasing pH. Figure in brackets denotes stability increase compared with control. N = 3; different letters denote significant (p < 0.05) differences between treatments

| Treatment | Reactivity of silicate | |
|---|---|---|
| | Time to pH 4.5 | Time to pH 5.0 from pH 4.5 |
| Control | 14 seconds (1) a | 36 seconds (1) b |
| Finely ground (<0.01 mm) | 45 seconds (3) b | 10 minutes (17) c |
| Charcoal 0.25-0.5 mm | 10 minutes (42) c | 2 hours (200) e |
| Charcoal 1.0-2.0 mm | 12 minutes (51) c | 16 hours (1600) f |
| Charcoal 2.0-4.0 mm | 41 minutes (176) d | >18 hours (>1800) f |

Table 3 shows that silicate embedded in charcoal reacts progressively less when (a) the particle size increases (P<0.001) and (b) when the pH nears equilibrium (P<0.001). This means that silicate embedded in charcoal with a particle size of >1 mm is >1500 times more stable at pH between 4.5 and 5.0 than free silicates exposed to the same pH range. Even silicates embedded in charcoal particles with a size between 0.25 and 0.5 mm, were at this pH around 200 times more stable than 'free silicates'. Surprisingly, very finely ground silicate charcoal derived from the 0.25-0.5 mm silicate charcoal was also 17 times more stable than 'free silicates', suggesting an intimate connection between the charcoal, and the silicate that provides a significant degree of stabilisation to the silicate.

Field Experiment Parys Mountain

Referring to FIG. 4, there is shown the results of leachable copper ions 0, 1, 37 and 77 days after treatment of heavy metal contaminated acidic soil (pH 2.5). FIG. 4 shows that amendment of the acidic soil contaminated with a range of heavy metals, silicate charcoal provides a significant reduction in copper leaching. In fact, after 1 and 37 days copper leaching was reduced to below detectable levels, compared to the control soil where after 37 days, leachable copper was on average 13 mg Cu per kg soil. After 77 days, soils amended with silicate charcoal leached less than 0.1 mg Cu per kg soil compared with the control where the level of copper leaching was around 11 mg per kg soil. Similar levels of leaching were found to occur in contaminated soil covered with top soil after 77 days.

Referring to FIGS. 5a and 5b, there is shown the establishment of Rye grass on non-amended soil and soil amended with 4% (w/w) silicate charcoal. Soils were originally acidic (pH 2.5) and contained high levels of a range of heavy metals. As can be seen, in FIG. 5a, for non-amended soil, Rye grass was unable to become established. However, the inventors were pleased to see that Rye grass did establish in the amended soil plot, as shown in FIG. 5b.

Conclusions

In summary, the inventors have demonstrated that at a low pH (i.e. between about 2 and 4.5), charcoal particles with a size between about 0.25 and 2 mm stabilises silicates by more than 50 fold. In addition, at low pH (i.e. between 2 and 4.5), larger charcoal particles provided surprisingly more stability than smaller ones. Furthermore, surprisingly, at a pH between 4.5 and 5.0, copper silicates in charcoal particles with a class size of between 1 and 2 mm are around 1600 times more stable than 'free silicates'. Silicates embedded in charcoal particles between 2 and 4 mm are more than 1800 times more stable than 'free silicates'. Silicate charcoals reduce metal leaching significantly in acidic soils that are heavily contaminated with heavy metals. Finally, the inventors have shown that amendment of silicate charcoal to acidic heavy metal contaminated soil restores plant growth.

Example 2—Effectiveness of Charcoals into which Hydrotalcites are Precipitated for the Removal of Arsenic Species from Water Two layered double hydroxides (LDHs)/hydrotalcite materials precipitated into charcoal were investigated for their efficacy in removing arsenic species ($As^{3+}$ and $As^{5+}$) from water. Al—Mg based and Fe—Mg based hydrotalcites were prepared by co-precipitation of Mg and Al/Fe salts with sodium hydroxide solution at pH>12 into either wood or charcoal. Both were made with Cl$^-$ as the interlayer anion with a ratio of $M^{2+}:M^{3+}$ of 2.15:1 in the initial solutions (Gillman, 2006, *Science of the Total Environment* 366:926-31). Materials were exposed to air, and solutions were therefore not guaranteed carbonate free resulting in the likely presence of some carbonate ions in the interlayer structure. Calcination was done at 550° C.

Two methods of loading hydrotalcites onto charcoal particles were used. Firstly, precipitation directly into charcoal derived from Scotch Pine wood charred at 550° C. and secondly precipitation directly into wood pine wood shavings followed by charring at 550° C. Three different concentrations of hydrotalcite were used using this method that resulted in charcoals with approximately 20, 40 and 60% (w/w) hydrotalcite. Materials prepared by precipitation directly into the charcoal were also calcined at 550° C. Charcoal particle sizes used throughout were 0.5-1 mm. Sorption experiments were carried out in triplicate.

In a further experiment, the effect of charring temperature on product performance was assessed using Al/Mg hydrotalcite and Fe/Mg hydrotalcite. Pine shavings were soaked in the different solutions to obtain a final concentration of hydrotalcite of 40% by weight. The loaded wood was charred at 350, 450 and 550° C. for 1 hour. Arsenic adsorption was assessed by placing 15 mg product in 15 ml arsenic solution containing 10 mg As/l. Solutions were shaken for 24 hours before remaining arsenic in the solution was assessed.

Subsequently an experiment was set up to determine the efficacy of charcoals containing Al/Mg hydrotalcites to adsorb arsenic from water with pH of 3, 7 and 11. As in the previous experiment, 15 mg material was added to 15 ml arsenic solution containing 10 mg As/l. Solutions were shaken for 24 hours before remaining arsenic in the solution was assessed.

To determine the amount of arsenic adsorbed by the different materials, 25 mg material was shaken for 24 h at 20° C. in 25 ml, 10 mg/l arsenic solution. Arsenic concentrations were determined using molybdenum blue colorimetric method (BS1728-12:1961), which has a minimum detection limit of 20 ppb arsenic. In brief, a sample containing the arsenic is mixed with an acid solution of $Mo^{VI}$, for example ammonium molybdate, to produce $AsMo_{12}O_{40}^{3-}$, which has an α-Keggin structure. This anion is then reduced by, for example, asorbic acid, to form the blue coloured β-keggin ion, $PMo_{12}O_{40}^{7-}$. The amount of the blue coloured ion produced is proportional to the amount of phosphate present and the absorption can be measured using a colorimeter to determine the amount of arsenic.

TABLE 4

List of abbreviations used

| Abbreviation (M = Al or Fe) | Material |
|---|---|
| M/HT | Hydrotalcite |
| cM/HT | Calcined hydrotalcite at 550° C. |
| M/HT/wood1 | Hydrotalcite loaded onto wood then charred (±20% HT by weight in charcoal) |
| M/HT/wood2 | Hydrotalcite loaded onto wood then charred. Initial solution concentration 2x that used in M/HT/wood1 (±40% HT by weight in charcoal) |
| M/HT/wood3 | Hydrotalcite loaded onto wood then charred. Initial solution concentration 3x that used in M/HT/wood1 (±60% HT by weight in charcoal) |
| M/HT/charcoal | Hydrotalcites loaded onto charcoal particles. Initial solution concentrations were the same as M/HT/wood2 (±40% HT by weight in charcoal) |
| cM/HT/charcoal | M/HT/charcoal calcined at 550° C. (±40% HT by weight in charcoal) |

Results:

$As^{3+}$ and $As^{5+}$ Sorption of Hydrotalcites Directly Precipitated into Charcoal or Loaded onto Wood First Before Charring

TABLE 5

Estimated removal of $As^{3+}$ and $As^{5+}$ by Al/Mg hydrotalcites in a pure form (Al/HT and cAl/HT) and Al/Mg hydrotalcites precipitated in the pore structure of charcoal derived from pine wood. Amounts adsorbed are expressed as mg As removed by 1 g hydrotalcite. N = 3

| | $As^{3+}$ | | $As^{5+}$ | |
|---|---|---|---|---|
| | Removal (mg/g) | std error | removal (mg/g) | std error |
| Al/HT | 3.784 | 0.071 | 9.991 | 0.007 |
| cAl/HT | 7.659 | 0.279 | 9.734 | 0.187 |

TABLE 5-continued

Estimated removal of $As^{3+}$ and $As^{5+}$ by Al/Mg hydrotalcites in a pure form (Al/HT and cAl/HT) and Al/Mg hydrotalcites precipitated in the pore structure of charcoal derived from pine wood. Amounts adsorbed are expressed as mg As removed by 1 g hydrotalcite. N = 3

| | $As^{3+}$ | | $As^{5+}$ | |
|---|---|---|---|---|
| | Removal (mg/g) | std error | removal (mg/g) | std error |
| Al/HT/charcoal | 4.050 | 0.515 | 16.258 | 0.780 |
| cAl/HT/charcoal | 7.963 | 0.283 | 7.093 | 0.208 |
| Al/HT/wood1 | 15.470 | 0.430 | 9.595 | 0.330 |
| Al/HT/wood2 | 12.655 | 0.218 | 13.158 | 0.355 |
| Al/HTwood3 | 10.085 | 0.332 | 10.640 | 0.070 |

Referring to FIG. 6 and Table 5, it can be seen that calcination increases uptake of $As^{3+}$ (Al/HT vs cAl/HT, Al/HT/charcoal vs cAl/HT/charcoal). However, calcination may decrease $As^{5+}$ sorption (Al/HT/charcoal vs cAl/HT/charcoal). Precipitation of hydrotalcites directly into charcoal may have little effect on the removal of arsenic expressed as mg arsenic removed by 1 g hydrotalcite.

In relation to wood loaded materials, there is an increase in the sorption capacity with increasing concentration of loading solutions and this suggests an increased loading of charcoal with hydrotalcite. The sorption of $As^{3+}$ and $As^{5+}$ are similar, much like that of calcined material, possibly because they were charred at 550° C. The inventors believe that hydrotalcites precipitated in wood before charring may be more efficient at removing arsenic from water.

TABLE 6

Estimated removal of $As^{3+}$ and $As^{5+}$ by Fe/Mg hydrotalcites in a pure form (Fe/HT and cFe/HT) and Al/Mg hydrotalcites precipitated in the pore structure of charcoal derived from pine wood. Amounts adsorbed are expressed as mg As removed by 1 g hydrotalcite. N = 3.

| | $As^{3+}$ | | $As^{5+}$ | |
|---|---|---|---|---|
| | Removal (mg/g) | std error | Removal (Mg/g) | std error |
| Fe/HT | 8.567 | 0.076 | 9.791 | 0.068 |
| cFe/HT | 8.578 | 0.337 | 7.477 | 1.105 |
| Fe/HT/charcoal | 5.295 | 0.050 | 14.663 | 0.213 |
| cFe/HT/charcoal | 10.908 | 0.093 | 7.308 | 0.150 |
| Fe/HT/wood1 | 5.130 | 0.255 | 6.780 | 0.240 |
| Fe/HT/wood2 | 3.025 | 0.310 | 2.258 | 0.490 |
| Fe/HT/wood3 | 3.612 | 0.135 | 3.402 | 0.450 |

Referring to FIG. 7 and Table 6, calcination may, in some cases, decrease $As^{5+}$ sorption (Fe/HT vs cFe/HT, Fe/HT/charcoal vs cFe/HT/charcoal) but in other cases increases $As^{3+}$ sorption (Fe/HT/charcoal vs cFe/HT/charcoal). Adsorption capacity of Fe/Mg hydrotalcites was not markedly affected by precipitating them into charcoal. Loading wood before charring with Fe/Mg hydrotalcites in general seemed to reduce the efficacy of the hydrotalcites, possibly suggesting a chemical change as a result of the charring process itself. Although the inventors do not wished to be bound by theory, they believe that this may be due to the charcoal acting as a reducing agent. However, the result showed that there was a small increase in arsenic sorption with increasing amounts of hydrotalcite precipitated into the charcoal matrix.

Example 3—Effect of Charring Temperature on Arsenic Uptake by Hydrotalcites in Charcoals Derived from Wood Loaded Materials

TABLE 7

Estimated removal of $As^{3+}$ and $As^{5+}$ by Al/Mg hydrotalcites in charcoal. Products were derived from pre-loaded pine wood that was subsequently charred at 350, 450 or 550° C. Amounts adsorbed are expressed as mg As removed by 1 g hydrotalcite. N = 3.

|  | $As^{3+}$ | | $As^{5+}$ | |
| --- | --- | --- | --- | --- |
|  | Adsorption (mg/g) | std error | Adsorption (mg/g) | std error |
| Al/HT 350 | 4.893 | 0.108 | 9.830 | 0.245 |
| Al/HT 450 | 10.878 | 0.076 | 13.718 | 0.268 |
| Al/HT 550 | 12.748 | 0.808 | 14.978 | 0.356 |

Referring to FIG. 8 and Table 7, increased sorption of arsenic was achieved by increasing the charring temperature of wood pre-loaded with hydrotalcites. The inventors believe that there are two possible reasons for this. Firstly, at higher temperatures charcoals are more carbonised and generally have a higher surface area. Secondly, as temperature increases, hydrotalcites become increasingly calcined as water and interlayer anions are lost.

TABLE 8

Estimated removal of $As^{3+}$ and $As^{5+}$ by Fe/Mg hydrotalcites in charcoal. Products were derived from pre-loaded pine wood that was subsequently charred at 350, 450 or 550° C. Amounts adsorbed are expressed as mg As removed by 1 g hydrotalcite. N = 3.

|  | $As^{3+}$ | | $As^{5+}$ | |
| --- | --- | --- | --- | --- |
|  | Sorption (mg/g) | std error | Sorption (mg/g) | std error |
| Fe/HT 350 | 6.568 | 0.228 | 6.140 | 0.323 |
| Fe/HT 450 | 6.588 | 0.193 | 6.580 | 0.220 |
| Fe/HT 550 | 5.035 | 0.320 | 6.083 | 0.188 |

Referring to FIG. 9 and Table 8, the inventors noted that charring wood loaded with Fe/Mg hydrotalcites at higher temperatures (550° C.) decreased capacity of the resulting product to adsorb arsenic compared to products that were charred at lower temperatures (350 and 450° C.). In general, charring temperature seemed to have little effect on arsenic adsorption of chars that were derived from woods loaded with Fe/Mg hydrotalcites.

Arsenic Sorption from Solutions with Different pH's

TABLE 9

Adsorption estimates of $As^{3+}$ and $As^{5+}$ using Al/Mg or Fe/Mg hydrotalcites at different pH (3, 7 and 11). Hydrotalcites were either used on their own (Metal/HT and cMetal/HT) or derived from from pre-loaded pine wood that was subsequently charred at 550° C., or from charcoals where the hydrotalcite was precipitated within existing charcoal (Metal/HT/Charcoal and cMetal/HT/Charcoal) The latter was calcined at 550° C. 15 mg product was added to 15 ml water containing 10 mg/l As. Adsorption is expressed as mg As/g hydrotalcite. N = 3.

|  | $As^{3+}$ | | | | | |
| --- | --- | --- | --- | --- | --- | --- |
|  | pH 3 | | pH 7 | | pH 11 | |
|  | Adsorption (mg/g) | Std error | Adsorption (mg/g) | Std error | Adsorption (mg/g) | Std error |
| Al/HT | 2.702 | 0.150 | 6.250 | 0.144 | 1.794 | 0.087 |
| cAl/HT | 7.941 | 0.056 | 8.620 | 0.056 | 7.741 | 0.358 |
| Al/HT/wood2 | 18.843 | 0.178 | 17.443 | 0.343 | 15.92 | 0.345 |
| Al/HT/charcoal | 1.495 | 0.333 | 1.203 | 0.783 | 2.108 | 0.055 |
| cAl/HT/charcoal | 7.108 | 0.428 | 5.380 | 0.118 | 3.565 | 0.293 |
| Fe/HT | 8.900 | 0.273 | 7.318 | 0.361 | 6.003 | 0.204 |
| cFe/HT | 9.560 | 0.225 | 9.155 | 0.310 | 9.550 | 0.058 |
| Fe/HT/wood2 | 5.243 | 0.275 | 2.600 | 0.250 | 3.468 | 0.295 |
| Fe/HT/charcoal | 9.203 | 0.305 | 3.748 | 0.390 | 2.070 | 0.483 |
| cFe/HT/charcoal | 8.445 | 0.273 | 8.925 | 0.258 | 12.660 | 0.328 |

|  | $As^{5+}$ | | | | | |
| --- | --- | --- | --- | --- | --- | --- |
|  | pH 3 | | pH 7 | | pH 11 | |
|  | Adsorption (mg/g) | Std error | Adsorption (mg/g) | Std error | Adsorption (mg/g) | Std error |
| Al/HT | 9.280 | 0.003 | 9.158 | 0.708 | 9.583 | 0.080 |
| cAl/HT | 10.000 | 0.000 | 10.00 | 0.000 | 8.577 | 0.771 |
| Al/HT/wood2 | 22.135 | 0.463 | 21.01 | 0.370 | 16.355 | 0.638 |
| Al/HT/charcoal | 14.915 | 0.163 | 5.515 | 0.950 | 4.740 | 0.450 |
| cAl/HT/charcoal | 14.600 | 0.403 | 18.255 | 0.228 | 14.858 | 0.120 |
| Fe/HT | 9.393 | 0.350 | 8.710 | 0.151 | 5.763 | 0.249 |
| cFe/HT | 9.529 | 0.471 | 9.917 | 0.070 | 9.121 | 0.508 |
| Fe/HT/wood2 | 3.268 | 0.173 | 3.575 | 0.148 | 5.520 | 0.368 |
| Fe/HT/charcoal | 11.605 | 0.198 | 4.360 | 0.120 | 4.080 | 0.303 |
| cFe/HT/charcoal | 10.848 | 0.670 | 17.153 | 0.350 | 17.373 | 0.655 |

Referring to FIGS. 10 and 11 and Table 9, Al/Mg Hydrotalcites incorporated into charcoal using hydrotalcite loaded wood as the precursor material produced better products compared to charcoals where the hydrotalcites were precipitated directly into the charcoal or compared with 'free' hydrotalcites. As shown in FIG. 10, calcining Al/Mg Hydrotalcites resulted in a 4-fold increase in arsenic adsorption capacity. As shown in FIGS. 12 and 13, Fe/Mg Hydrotalcites incorporated into charcoal using hyrotalcite loaded wood as the precursor material provided products were in general not as effective at adsorbing arsenic from solutions compared to charcoals where the hydrotalcites were precipitated directly into the charcoal.

Example 4—Use of Reduced Iron Char for the Removal of Bromate from Water

Introduction

Contamination of drinking water with bromate ($BrO^{3-}$) at levels ranging from 0.4 to 60 µg $L^{-1}$ may be found following ozonation of water containing background bromide ($Br^-$). Based on rodent studies, bromate is classified as a "possible human" carcinogen, and drinking water standards of 10-25 µg $L^{-1}$ are now implemented in many countries. Bromate is highly soluble, stable in water, and difficult to remove using conventional treatment technologies.

Materials and Methods

Production of iron char: 112 g $Fe_2(SO_4)_3 \cdot 7H_2O$ was dissolved in 50 ml water till fully dissolved. The resulting solution was mixed with 100 g dried pine shavings and dried at 80° C. overnight till dry. The thus impregnated wood was charred at 450° C. for 1 hour. The metal char that was produced in this way was highly magnetic and contained an estimated 50% iron by weight.

Experimental set up: a 5 mg L-1 Bromate solution was produced by dissolving 5.88 mg NaBrO3 in one liter RO water. This was done by creating a stock solution containing 0.588 g NaBrO3 in 100 ml and transferring one ml of this stock solution to 1000 ml RO water.

The following treatments were created:—
1. Control, containing 5 mg $l^{-1}$ bromate
2. 0.1 g iron char in 500 ml, 5 mg $l^{-1}$ bromate
3. 0.2 g iron char in 500 ml, 5 mg $l^{-1}$ bromate
4. 0.3 g iron char in 500 ml, 5 mg $l^{-1}$ bromate
5. 0.4 g iron char in 500 ml, 5 mg $l^{-1}$ bromate
6. 0.5 g iron char in 500 ml, 5 mg $l^{-1}$ bromate Solutions were held in 500 ml brown plastic bottles to prevent exposure to light. two bottles per treatment were used. Bottles were strapped onto a 'head over heels' shaker with a rotation speed of one turn per 2 seconds. To determine how fast the iron char removed (reduced) the bromate, each bottle was sampled after 1 hour, after 3 hours and after 24 hours. After sampling the 10 ml solution was passed through a 0.45 µm syringe filter to remove any particulates and the filtered solutions were stored in the dark at 5° C. till analysis.

Bromate analysis: Bromate concentrations were estimated using a protocol described by Brookman et al., (2011). In brief, to 7 ml filtered solution, 2 ml hydrochloride acidified glycine at pH 1 was added. To this mixture 1 ml of a 1M solution of Iodite ($KIO_3$) was added. The solution was allowed to react for 5 minutes before absorbance was measured on a spectrophotometer at λ=352 nm. The measured absorbance was compared against a standard curve of absorbance against known (0, 0.01, 0.1, 1, 2 and 5 ppm) concentrations of bromate to determine reduction of bromate in the samples.

Results

TABLE 10

Effect of amendment rate and exposure time of iron-char on concentrations of bromate in water (n = 2). Data are presented as averages ± SEM. Different letters in subscript indicate significant differences (P < 0.05) between values.

| Treatment | Amendment rate (g $l^{-1}$) | Exposure (hours) | Bromate Concentration (mg $l^{-1}$) | Reduction (%) |
|---|---|---|---|---|
| Control | 0 | 1 | 5 | 0 |
|  | 0 | 3 | 5 | 0 |
|  | 0 | 24 | 5 | 0 |
| Fe-char | 0.2 | 1 | 0.80 ± 0.25$^a$ | 84.0 ± 5.0 |
|  | 0.2 | 3 | 0.56 ± 0.03$^b$ | 88.7 ± 0.6 |
|  | 0.2 | 24 | 0.31 ± 0.03$^c$ | 93.7 ± 0.5 |
|  | 0.4 | 1 | 0.76 ± 0.07$^a$ | 84.8 ± 1.4 |
|  | 0.4 | 3 | 0.40 ± 0.02$^b$ | 91.9 ± 0.4 |
|  | 0.4 | 24 | 0.11 ± 0.00$^d$ | 97.9 ± 0.0 |
|  | 0.6 | 1 | 0.63 ± 0.20$^a$ | 87.5 ± 4.0 |
|  | 0.6 | 3 | 0.35 ± 0.03$^c$ | 93.1 ± 0.7 |
|  | 0.6 | 24 | 0.10 ± 0.00$^d$ | 98.0 ± 0.03 |
|  | 0.8 | 1 | 0.62 ± 0.21$^a$ | 87.5 ± 4.1 |
|  | 0.8 | 3 | 0.30 ± 0.03$^c$ | 93.9 ± 0.5 |
|  | 0.8 | 24 | 0.10 ± 0.00$^d$ | 98.1 ± 0.07 |
|  | 1.0 | 1 | 0.36 ± 0.02$^c$ | 93.2 ± 0.48 |
|  | 1.0 | 3 | 0.29 ± 0.01$^c$ | 94.2 ± 0.27 |
|  | 1.0 | 24 | 0.10 ± 0.00$^d$ | 98.1 ± 0.03 |
| significance |  |  | P < 0.001 | P < 0.001 |

A relative small quantity of iron char (0.2 g $l^{-1}$) removed 85% of the bromate from water that was spiked with 5 mg $l^{-1}$ bromate. Increasing the exposure time to 24 hours increased removal rates to 94%, increasing the amendment rate had a slight effect with removal rates of the 0.4-1.0 g $l^{-1}$ amendment rate resulted in 93% removal of bromate after one hour and >98% removal after 24 hours. The levels of removal achieved were below the detection limit. There were no significant differences in the removal rates of bromate between amendment rates of 0.4, 0.6, 0.8 and 1.0 g iron char per liter.

In a subsequent experiment where oxidised iron char was used to remove bromate no significant removal of bromate could be shown (1 g oxidised iron char $l^{-1}$ water removed 36% of the bromate (5 ppm) after 24 hours shaking). Oxidation was achieved by wetting the iron char and subsequently drying it at 80° C.

Conclusions:
Composites made from charcoal and iron were effective at removing bromate from water
The most likely mechanism by which bromate is removed is via reduction of bromate to bromide
Oxidised iron incorporated within the charcoal was ineffective at removing bromate, further confirming that the iron created a reducing environment within the char that allowed its removal from the water.

Example 5—Ability of Iron Char to Remove Arsenic from Water

Introduction

An experiment was set up to assess the ability of char into which iron (both elementary iron and oxidised iron) was incorporated via a reduction reaction to remove arsenate from water. The treatment was compared with amendments of iron oxide (both red iron oxide ($Fe_2O_3$) and black iron oxide ($Fe_3O_4$)). Iron oxides are commonly used to remove arsenic from drinking water via a co-precipitation reaction with As(V).

Materials and Methods

Production of iron char: 112 g $Fe_2(SO_4)_3.7H_2O$ was dissolved in 50 ml water. The resulting solution was mixed with 100 g dried pine chips and dried at 80° C. overnight. The thus impregnated wood was charred at 450° C. for 1 hour. The metal char that was produced in this way was highly magnetic and contained an estimated 50% iron by weight (Product Code: FeCH). To test if oxidising the iron inside the char had an effect on arsenic adsorption, some of the iron-char was wetted and subsequently dried in the oven to create Fe-oxide/hydroxide (rust) inside the char. It was assumed that this treatment only partially oxidised the iron inside the char (Product Code: FePO). To complete the oxidation of the iron inside the char, the iron char was subjected to a controlled burn to create a product that was visually red (Product Code: FeFO). Experimental set up: The ability of the three charcoal products containing iron (FeCH) or iron oxides/hydroxides (FePO and FeFO) were compared with black iron oxide ($Fe_3O_4$) and red iron oxide ($Fe_2O_3$) for their ability to remove arsenic from water. One liter plastic bottles were filled with a one liter solutions of arsenate ($AsO_4^{3-}$) containing 40 mg $l^{-1}$ arsenate.

The following treatments were created in each bottle in duplicate
1. Control, no amendment
2. 2.5 g iron char (FeCH)
3. 2.5 g partially oxidised iron char (FePO)
4. 2.5 g fully oxidised iron char (FeFO)
5. 2.5 g black iron oxide iron ($Fe_3O_4$; IOB)
6. 2.5 g red iron oxide ($Fe_2O_3$; IOR)

Bottles were strapped onto a 'head over heels' shaker with a rotation speed of one turn per 2 seconds. To determine how fast the iron char removed the arsenate, each bottle was sampled at time 0 (before amendment), after 10 minutes. 1 hour, 3 hours, 7 hours and after 4 days (168 hours). After sampling the 10 ml solution was passed through a. 0.45 µm syringe finer to remove any particulates and the filtered solutions were stored in the dark at 5° C. till analysis. Arsenic concentrations in each sample were determined using ICP-OES. Besides arsenic concentrations in each sample, pH was measured using a pH probe.

Results

Iron char was 4 time more effective at removing arsenic from the water than iron-oxide (see FIG. 14) removing the equivalent of 16 g arsenic per kg product. Based on the amount of adsorbent, which was half the weight of the iron char, the iron in the char removed 8 times more arsenic than the equivalent amount of iron-oxide. In general, arsenic is least soluble at pH between 3.5 and 6. The arsenic removal capacity of the different products did not seem to be affected by pH. In fact the iron-char (especially the reduced products) raised the pH significantly from pH 3 to pH 7 (see FIG. 15).

Conclusions

Charcoal composites containing either reduced iron or iron oxide were highly effective at adsorbing arsenic from water Charcoal composites were 8 times more effective at removing arsenic from water than the equivalent amount of iron oxide

Example 6—Production of Charcoal-Silicate Composites for Removing Heavy Metals from Solution Introduction Impregnation of macro pores with a solution of potassium silicate followed by impregnation with a calcium salt to bring about precipitation of the silicate in the form of insoluble calcium silicate is technically challenging as a concentrated solution of potassium silicate is viscous and therefore does not easily soak into the macro-pores present in charcoal. To simplify the creation of a porous charcoal/calcium silicate granule a range of materials was tested for their ability to form a granule of sufficient hardness to act as a product for heavy metal removal.

Materials and Methods

For this purpose green waste compost (GWC) was charred at 450° C. for at least 1 hour. Charcoal produced from green waste compost contains around 50% carbon and 50% minerals, half of which are alkaline earth and alkali minerals (potash), the other half being insoluble minerals such as silica. It was hypothesised that the alkaline earth metal ions (calcium mainly) would react with the potassium silicate to form insoluble $CaSiO_3$. An experiment was set up to determine how much Calcium ions (added in the form of $Ca(NO_3)_2.4H_2O$ or $Ca(OH)_2$ needed to be added to the mix to create a granular material that could act as a product for metal adsorption. $Ca(OH)_2$ is mainly insoluble and therefore slow acting while $Ca(NO_3)_2.4H_2O$ is highly soluble. The aim was to create a product with great hardness.

The following mixes were created using charred green waste compost (GWC char).

1) 50 g GWC Char, 50 g 30% $K_2SiO_3$, 11.75 g $Ca(NO_3)_2.4H_2O$
2) 50 g GWC Char, 50 g 15% $K_2SiO_3$, 5.90 g $Ca(NO_3)_2.4H_2O$
3) 50 g GWC Char, 50 g 7.5% $K_2SiO_3$, 2.95 g $Ca(NO_3)_2.4H_2O$
4) 50 g GWC Char, 50 g 30% $K_2SiO_3$, 9.4 g $Ca(NO_3)_2.4H_2O$
5) 50 g GWC Char, 50 g 15% $K_2SiO_3$, 4.7 g $Ca(NO_3)_2.4H_2O$
6) 50 g GWC Char, 50 g 7.5% $K_2SiO_3$, 2.35 g $Ca(NO_3)_2.4H_2O$
7) 50 g GWC Char, 50 g 30% $K_2SiO_3$, 3 g $Ca(OH)_2$
8) 50 g GWC Char, 50 g 15% $K_2SiO_3$, 1.5 g $Ca(OH)_2$
9) 50 g GWC Char, 50 g 30% $K_2SiO_3$
10) 50 g GWC Char, 50 g 15% $K_2SiO_3$
11) 50 g GWC Char, 50 g 7.5% $K_2SiO_3$ Ingredients were mixed thoroughly and the material was shaken in an aluminium tray to break the material up into small balls with a size of between 2-3 mm. The resulting aggregates were dried in an oven at 80° C. overnight and were subsequently assessed according to appearance, colour and hardness.

The following hardness scale was used
1) Soft: Granules break when an object less than 200 g is placed on top
2) Fairly hard: Granules break when an object of between 200 and 5000 g is placed on top
3) Hard: Granules break when an object of 5000-10,000 g is placed on top
4) Very hard: Granules break when an object of >10,000 g is place on top Results

TABLE 11

Product characteristics using different mixtures of green waste compost char, potassium silicate, $Ca(NO_3)_2 \cdot 4H_2O$

| Mixture | Appearance | Colour | Hardness |
| --- | --- | --- | --- |
| 1 | granulated | grey | hard |
| 2 | granulated | grey | fairly hard |

TABLE 11-continued

Product characteristics using different mixtures of green
waste compost char, potassium silicate, Ca(NO₃)₂•4H₂O

| Mixture | Appearance | Colour | Hardness |
|---|---|---|---|
| 3 | granulated | grey | soft |
| 4 | granulated | grey | hard |
| 5 | granulated | grey | fairly hard |
| 6 | granulated | grey | soft |
| 7 | granulated | black | soft |
| 8 | granulated | black | fairly hard |
| 9 | granulated | black | very hard |
| 10 | granulated | black | soft |
| 11 | granulated | black | Fairly hard |

The best product was produced by directly amending Green waste compost char with an equal weight of a 30% potassium silicate solution. The thus produced product formed a hard absorbent granulated product with the ability to resist pressures of between 50 and 70 kg. In theory the product should be able to bind 15% of its weight in heavy metals (150,000 mg metal ions $kg^{-1}$).

Use of Charcoal-Silicate Composites for Removing Heavy Metals from Solution

Introduction

An experiment was set up to assess the capacity of composites made from green waste compost char and silicate to remove different heavy metals from solutions with different pH. It was hypothesised that if the composite was capable of stabilising its internal pH to a pH>6 it would be capable of removing heavy metals from solutions with an acidic pH.

Materials and Methods

Production of composite: 100 g of charred green waste compost (charred at 450° C. for 1 hour) was mixed with 100 g 30% K2SiO3. The mix was shaken in a tray to form aggregates with a size between 2 and 5 mm. The particles were then dried in an oven at 80° C. for 24 hours. In theory, the product should be able to bind 15% of its weight in heavy metals.

Preparation of water with pH 2, 3, 4, 5 and 6: The pH of 10 litters of RO water was adjusted using concentrated nitric acid. Six 500 ml plastic bottles were filled with water of a specific pH.

Preparation of heavy metal solutions: 5 ml stock solutions containing 50,000 mg of either cadmium (Cd), copper (Cu) or zinc (Zn) were pipetted into 495 ml RO water, resulting in a concentration of 500 mg heavy metal in the water. The metals were added as metal nitrates and actual concentrations were measured using ICP-OES subsequently.

Experimental set up: The above preparations resulted in the following treatments:

| | Heavy Metal | | |
|---|---|---|---|
| pH | Copper | Cadmium | Zinc |
| 2 | 500 mg $l^{-1}$ | 500 mg $l^{-1}$ | 500 mg $l^{-1}$ |
| 3 | 500 mg $l^{-1}$ | 500 mg $l^{-1}$ | 500 mg $l^{-1}$ |
| 4 | 500 mg $l^{-1}$ | 500 mg $l^{-1}$ | 500 mg $l^{-1}$ |
| 5 | 500 mg $l^{-1}$ | 500 mg $l^{-1}$ | 500 mg $l^{-1}$ |
| 6 | 500 mg $l^{-1}$ | 500 mg $l^{-1}$ | 500 mg $l^{-1}$ |

Each treatment was set up in duplicate and to each bottle 0.5 g of product was added. Once the composite was added (which sank to the bottom of each bottle) treated bottles were left static on a bench at room temperature to allow the composite to adsorb the metal.

Metal analysis: each bottle was sampled before amendment (t=0) to obtain the actual metal concentration in each bottle, after 1 hour, 3 hours, 6 hours, 24 hours and 48 hours. For this purpose 20 ml solution was withdrawn from the middle of each bottle with a 20 ml syringe. The sample was then passed through a 0.45 μm filter to remove any particulates and the concentration of heavy metal was assessed using ICP-OES.

Concentrations obtained for the different treatments were subtracted from the initial concentration of metal in each bottle to calculate metal uptake by the composite. pH: To ensure that the composite did not change the pH of the solutions significantly (a rise in pH above 7 could result in the formation of insoluble metal hydroxides), the pH of the solution at the bottom of each flask was measured after 24 hours.

Results

At pH 6 the silicate/char composite adsorbed more than 175,000 mg Cu $kg^{-1}$ composite (see FIG. 16). This equates to an adsorption of Cu ions above the theoretical maximum of 150,000 mg Cu $kg^{-1}$. Whereas most of the adsorption can be accounted for by the formation of Copper silicate, it is possible that part of the removal of Cu was due to precipitation of Cu in the form of Copper hydroxides. Even at pH 3 the composite adsorbed between 30,000 and 40,000 mg Cu $kg^{-1}$ (see FIG. 16). Table 12 shows that the pH of the solution was around 3.3 and therefore the only possibility is that the composite maintained an alkaline pH (>pH6) within the composite as allowing copper silicate to form.

TABLE 12 pH changes after 20 hours near silicate/char composites
in 500 ml bottles containing metal solutions (Cu, Zn
and Cd) that had an original pH of 2, 3, 4, 5 or 6.

| | Metal solution | | | | |
|---|---|---|---|---|---|
| Original pH | Cu | Zn | Cd | Average | SE |
| 2.11 | 2.17 | 2.28 | 2.25 | 2.23 | 0.02 |
| 3.00 | 3.34 | 3.52 | 3.70 | 3.52 | 0.08 |
| 4.05 | 5.21 | 5.97 | 6.27 | 5.82 | 0.20 |
| 4.94 | 5.35 | 5.92 | 6.34 | 5.86 | 0.17 |
| 5.65 | 5.36 | 5.92 | 6.34 | 5.87 | 0.18 |

A similar result was obtained with the removal of cadmium from solution. Best results were obtained at pH 6 with removal of 100,000 mg Cd $kg^{-1}$ composite (see FIG. 17).

However at pH 3, still more than 60,000 mg of Cd was removed from a solution that measured a pH of 3.7 by the composite suggesting that the composite retained a pH well above this value to allow formation of Cadmium silicate within the composite.

Zinc was adsorbed the least from the three heavy metals tested with maximum adsorption of 70,000 mg $kg^{-1}$ composite at pH 6 (see FIG. 18). However, at lower pH (4 and 3) still more than 40,000 mg kg-1 composite (see FIG. 18) was adsorbed suggesting that the composite maintained an alkaline pH within allowing Zinc silicate to form via a displacement reaction.

The silicate composite changed the pH of the solutions near the particles slightly, with the greatest increase observed in the solutions containing Cadmium nitrate. In none of the treatments did the composite raise the pH of the solution above pH 6.34, while on average solutions remained below pH 5.9. This implies that the metals that were taken out of solution by the silicate composite did so because the internal pH of the composite was significantly higher than the surrounding liquid.

Conclusions

Composites made from green waste compost char and silicates were effective at adsorbing a range of heavy metals, including copper, cadmium and zinc from solutions with a pH as low as 3

The mechanism by which these composites remove metals is via maintenance of a high pH within their structure allowing formation of insoluble metal silicates Example 7—Use of Calcium Phosphate Modified Chars for the Adsorption of Heavy Metals from Anaerobic Muds Introduction Drill cutting muds are often heavily contaminated with heavy metals, including barium (weighting agent), aluminium (anti-frothing agent) and others that are part of the geology of the rock that is drilled. The pH of these materials is often highly alkaline (pH>10) and their redox is often negative (they become highly anaerobic when water-logged). Methods using alkaline adsorbents are inappropriate for these materials as they only raise the pH of the material further.

Materials and Methods

Production of a phosphate/char composite: An acidic metal adsorbent was produced using charcoal with a very high mineral content that was produced from the pyrolysis of straw at high temperatures. The material had an ash content of >30% most of which consisted of calcium oxides and hydroxides with a small proportion of Calcium carbonates. To produce a char that contained mainly Calcium phosphate, 50 g char was treated with 6 ml 85% $H_3PO_4$ dissolved in 330 ml water to allow the char to become saturated with the acid. The thus created material was left for two days at 20° C. to allow the phosphoric acid to react with the calcium oxides/hydroxides and carbonates inside the charcoal to form Calcium phosphates. After the reactions were complete, the material was dried in an oven at 40° C. The pH of the thus created material was between 3.2 and 4.0, suggesting that most of the alkaline earth metals inside the char had reacted with the acid and that oxides, hydroxides and carbonates were converted to water (and carbon dioxide in the case of carbonates).

Experimental set up: Drilling muds containing a cocktail of leachable metals (including barium, aluminium, copper, lead chromium and nickel), a pH of 10.4 and a redox potential of −110 mV were amended with 1% and 2% phosphate char composites which were mixed thoroughly with a spatula. Controls received no amendment but were mixed as well. The materials were incubated for three days and remained water logged for the duration of the experiment. The experiments were set up in 100 ml porcelain containers that were closed with a porcelain lid (not airtight). Each containing approximately 50 g of material. Each treatment was set up in duplicate.

Metal analysis: After 3 days, approx. 3 g mud was taken from each container and suspended in a plastic sample bottle containing 20 ml of RO water. Samples were shaken vigorously for 2 minutes in order to bring leachable metals into suspension. Samples were left overnight and shaken again, before being centrifuged for 10 minutes at 3000 rpm. The supernatant was then passed through a 0.45 μm filter and the filtrate was analysed for metals using ICP-EOS.

To allow the amount of leachable metals to be expressed as metals per g dry weight soil, approx. 6 g of wet mud was weighted out on a pre-weighted piece of aluminium and dried in an oven at 100° C. overnight. Water content of the samples was subsequently calculated and used to convert sample wet weight into sample dry-weight.

Results

TABLE 13

Leachable metals present in non-treated drill cuttings (Control) and drill cuttings that were amended with either 1% or 2% (by weight) phosphate modified char. Data represent the means and standard error of two replicates.

| Treatment | Leachable metal concentrations ($\mu g\ kg^{-1}$) | | | | | | |
|---|---|---|---|---|---|---|---|
|  | Al | Cu | Ba | Pb | Cr | Ni | Cd |
| Control | 261,400 | 1,372 | 13,200 | 2,024 | 358 | 357 | 12 |
| SE | 47,200 | 105 | 1,600 | 346 | 51 | 33 | 2 |
| 1% amendment | 73,900 | 280 | 3,600 | 964 | 104 | 84 | 3 |
| SE | 14,800 | 36 | 900 | 69 | 23 | 10 | 0 |
| 2% amendment | 60,200 | 186 | 2,100 | 810 | 87 | 61 | 3 |
| SE | 10,900 | 14 | 400 | 91 | 15 | 7 | 0 |
| Significance of differences | P < 0.001 | P < 0.001 | P < 0.001 | P < 0.001 | P < 0.001 | P < 0.001 | P < 0.001 |

Amendment with phosphate modified char resulted in a 75-90% reduction of leachable aluminium, copper, barium, nickel and cadmium. Leachable lead and chromium were reduced by around 60%. Increasing the amendment rate of the phosphate decreased the amount of leachable metal, but only slightly.

Conclusions

Phosphate modified chars were effective at reducing leachable concentrations of most heavy metals in alkaline and highly anaerobic drilling muds.

The invention claimed is:

1. A composite adsorbent material comprising a porous carbon carrier matrix and an adsorbent species, wherein:
    the carrier matrix comprises non-activated charcoal, and
    the adsorbent species is selected from one or more of a silicate or a hydrotalcite, precipitated within the pores of the carrier matrix.

2. The adsorbent material according to claim 1, wherein the adsorbent species is also disposed in void spaces formed between adjacent particles comprising the carrier matrix.

3. The adsorbent material according to claim 1, wherein the carrier matrix comprises or is derived from charred plant material, charred compost, a charred hardwood or a charred softwood species of plant.

4. A soil or waste amendment composition comprising the composite adsorbent material according to claim 1, for use in changing the pH of soil or waste.

5. The adsorbent material according to claim 1, wherein the carrier matrix is substantially macroporous, and wherein the macropores have average diameters in the range of 50 nm to 500 nm, or 50 to 300 nm, or 50 to 200 nm.

6. The adsorbent material according to claim 1, wherein the concentration of the adsorbent species in the composite material is between 1-90% (w/w), 10-75% (w/w) or 20-50% of the total weight of the composite material.

7. A particle comprising the composite adsorbent material according to claim 1, wherein the mean particle size is between about 0.1 mm and 50 mm, or between about 0.1 mm and 25 mm, or between about 0.25 mm and 50 mm.

8. The adsorbent material according to claim 1, wherein the adsorbent species is basic.

9. The adsorbent material according to claim 1, wherein the adsorbent species comprises a silicate.

10. The adsorbent material according to claim 1, wherein the adsorbent species comprises a metal silicate and/or hydrotalcite.

11. The adsorbent material according to claim 10, wherein the metal silicate and/or hydrotalcite comprises a reduced metal species of manganese, cobalt, copper, zinc, iron, nickel, bismuth or silver.

12. A method of preparing a composite adsorbent material according to claim 1, the method comprising the steps of:
(i) providing a porous carbon carrier matrix comprising non-activated charcoal; and
(ii) precipitating an adsorbent species selected from one or more of a silicate or a hydrotalcite within the pores of the carrier matrix, to thereby form a composite adsorbent material.

13. The method according to claim 12, wherein the carbon carrier matrix is heated to at least 300° C., 400° C., 450° C., 500° C., 600° C., 800° C., 1000° C. or more in an oxygen limited environment prior to the precipitation step, and wherein the carbon matrix is impregnated with a soluble salt prior to being heated resulting in the reduction and precipitation of at least one of the ions of the impregnating salt.

14. A composite adsorbent material comprising a porous carbon carrier matrix and an adsorbent species, wherein:
the carrier matrix comprises non-activated carbon, and
the adsorbent species is an alkaline earth metal oxide, precipitated within the pores of the carrier matrix.

15. The composite adsorbent material according to claim 14, wherein the alkaline earth metal oxide is calcium oxide or magnesium oxide.

16. A method of preparing a composite adsorbent material according to claim 14, the method comprising the steps of:
(i) providing a porous carbon carrier matrix comprising non-activated carbon; and
(ii) precipitating an adsorbent species comprising an alkaline earth metal oxide within the pores of the carrier matrix, to thereby form a composite adsorbent material.

17. A method of adsorbing inorganic substances, the method of comprising contacting the composite material of claim 1 with the inorganic substances.

18. A method according to claim 17, wherein the inorganic substances comprise an environmental contaminant or pollutant present in drinking water, or an industrial or agricultural effluent; the inorganic substances comprising heavy metals or heavy-metal containing compounds present in landfill leachate, groundwater, drilling waste, mine drainage, mine spoil, or sewage sludge; the inorganic substances comprising heavy metals or heavy metal-containing compounds, phosphates etc. and are present in soil amendments; or the inorganic substances comprise bromates, arsenates, selenium, antimony, strontium, cyanides, chlorinated compounds, nitrates, sulphates or arsenites.

19. A method of removing a pollutant from a fluid, the method comprising contacting a fluid comprising a pollutant with the composite adsorbent material according to claim 1 under conditions suitable to remove the pollutant from the fluid, wherein the composite material is supported on a support, for example in a cartridge or is placed inside a porous bag or filter, or is fixed onto a solid support, over which the polluted fluid is passed.

* * * * *